(12) United States Patent
Ray et al.

(10) Patent No.: US 12,301,890 B2
(45) Date of Patent: May 13, 2025

(54) HYBRID-TREE CODING FOR INTER AND INTRA PREDICTION FOR GEOMETRY CODING

(71) Applicant: QUALCOMM Incorporated, San Diego, CA (US)

(72) Inventors: Bappaditya Ray, San Diego, CA (US); Adarsh Krishnan Ramasubramonian, Irvine, CA (US); Luong Pham Van, San Diego, CA (US); Geert Van der Auwera, Del Mar, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/562,398

(22) Filed: Dec. 27, 2021

(65) Prior Publication Data

US 2022/0210480 A1     Jun. 30, 2022

Related U.S. Application Data

(60) Provisional application No. 63/131,546, filed on Dec. 29, 2020.

(51) Int. Cl.
*H04N 19/46*     (2014.01)
*H04N 19/107*     (2014.01)
(Continued)

(52) U.S. Cl.
CPC .......... *H04N 19/96* (2014.11); *H04N 19/107* (2014.11); *H04N 19/119* (2014.11); *H04N 19/46* (2014.11)

(58) Field of Classification Search
CPC .... H04N 19/96; H04N 19/119; H04N 19/107; H04N 19/46
See application file for complete search history.

(56) References Cited

U.S. PATENT DOCUMENTS

2019/0087979 A1   3/2019   Mammou et al.
2019/0146736 A1*   5/2019   Ogawa .................. G06F 3/1291
                                                 358/1.15
(Continued)

FOREIGN PATENT DOCUMENTS

EP           3493158 A1    6/2019
EP           3553747 A1   10/2019
WO    WO-2021046817 A1 *   3/2021

OTHER PUBLICATIONS

International Search Report and Written Opinion—PCT/US2021/065350—ISA/EPO—Apr. 12, 2022.
(Continued)

*Primary Examiner* — Dave Czekaj
*Assistant Examiner* — Berteau Joisil
(74) *Attorney, Agent, or Firm* — Shumaker & Sieffert, P. A.

(57) ABSTRACT

A device for decoding a bitstream that includes point cloud data is configured to determine an octree that defines an octree-based splitting of a space containing the point cloud, wherein a leaf node of the octree contains one or more points of the point cloud; and directly decode positions of each of the one or more points in the leaf node, wherein to directly decode the positions of each of the one or more points in the leaf node, the one or more processors are further configured to: generate a prediction of the one or more points; and determine the one or more points based on the prediction.

30 Claims, 18 Drawing Sheets

(51) Int. Cl.
*H04N 19/119* (2014.01)
*H04N 19/96* (2014.01)

(56) References Cited

U.S. PATENT DOCUMENTS

| | | | |
|---|---|---|---|
| 2020/0252647 A1* | 8/2020 | Lasserre | H04N 19/597 |
| 2021/0105504 A1* | 4/2021 | Hur | H04N 19/167 |
| 2021/0144403 A1 | 5/2021 | Lasserre et al. | |
| 2021/0166436 A1* | 6/2021 | Zhang | G06T 9/001 |
| 2021/0167795 A1 | 6/2021 | Lasserre et al. | |
| 2021/0168386 A1 | 6/2021 | Zhang et al. | |
| 2021/0201541 A1 | 7/2021 | Lasserre et al. | |
| 2021/0209812 A1* | 7/2021 | Han | H04N 19/1883 |
| 2021/0217205 A1* | 7/2021 | Yea | H04N 19/96 |
| 2021/0218994 A1* | 7/2021 | Flynn | G06T 9/001 |
| 2021/0342997 A1* | 11/2021 | Malreddy | G06T 7/70 |

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

3DG: "G-PCC Codec Description v8," 131. MPEG Meeting, Jun. 29, 2020-Jul. 3, 2020, Online, (Motion Picture Expert Group or ISO/IEC JTC1/SC29/WG11), Coding of Moving Pictures and Audio, Convenorship: JISC (Japan), No. N19525, Oct. 2, 2020, 142 Pages, Oct. 10, 2020, XP030292244.

* cited by examiner

HYBRID-TREE CODING FOR INTER AND INTRA PREDICTION FOR GEOMETRY CODING

This application claims the benefit of U.S. Provisional Patent Application 63/131,546, filed 29 Dec. 2020, the entire content of each being incorporated herein by reference.

TECHNICAL FIELD

This disclosure relates to point cloud encoding and decoding.

SUMMARY

In general, this disclosure describes a hybrid-tree coding method combining octree coding and predictive coding for enhanced inter/intra prediction at the block level for point cloud compression.

In one example, this disclosure describes a method of coding a point cloud, the method comprising: determining an octree that defines an octree-based splitting of a space containing the point cloud, wherein: a leaf node of the octree contains one or more points of the point cloud, and positions of each of the one or more points in the leaf node are directly signaled; generating a prediction of the one or more points using intra prediction or inter prediction; and coding a syntax element that indicates whether the one or more points predicted using intra prediction or inter prediction.

According to one example of this disclosure, a device for decoding a bitstream that includes point cloud data includes a memory to store the point cloud data and one or more processors coupled to the memory and implemented in circuitry, the one or more processors configured to determine an octree that defines an octree-based splitting of a space containing the point cloud, wherein a leaf node of the octree contains one or more points of the point cloud; and directly decode positions of each of the one or more points in the leaf node, wherein to directly decode the positions of each of the one or more points in the leaf node, the one or more processors are further configured to generate a prediction of the one or more points and determine the one or more points based on the prediction.

According to another example of this disclosure, a method of decoding a point cloud includes determining an octree that defines an octree-based splitting of a space containing the point cloud, wherein a leaf node of the octree contains one or more points of the point cloud; directly decoding positions of each of the one or more points in the leaf node, wherein directly decoding the positions of each of the one or more points in the leaf node comprises generating a prediction of the one or more points; and determining the one or more points based on the prediction.

According to another example of this disclosure, a computer-readable storage medium stores instructions that when executed by one or more processors cause the one or more processors to: determine an octree that defines an octree-based splitting of a space containing a point cloud, wherein a leaf node of the octree contains one or more points of the point cloud; and directly decode positions of each of the one or more points in the leaf node, wherein to directly decode the positions of each of the one or more points in the leaf node, the instructions cause the one or more processors to: generate a prediction of the one or more points; and determine the one or more points based on the prediction.

According to another example of this disclosure, an apparatus includes means for determining an octree that defines an octree-based splitting of a space containing the point cloud, wherein a leaf node of the octree contains one or more points of the point cloud; means for directly decoding positions of each of the one or more points in the leaf node, wherein the means for directly decoding the positions of each of the one or more points in the leaf node comprises: means for generating a prediction of the one or more points; and means for determining the one or more points based on the prediction.

The details of one or more examples are set forth in the accompanying drawings and the description below. Other features, objects, and advantages will be apparent from the description, drawings, and claims.

DETAILED DESCRIPTION

Figure 1:
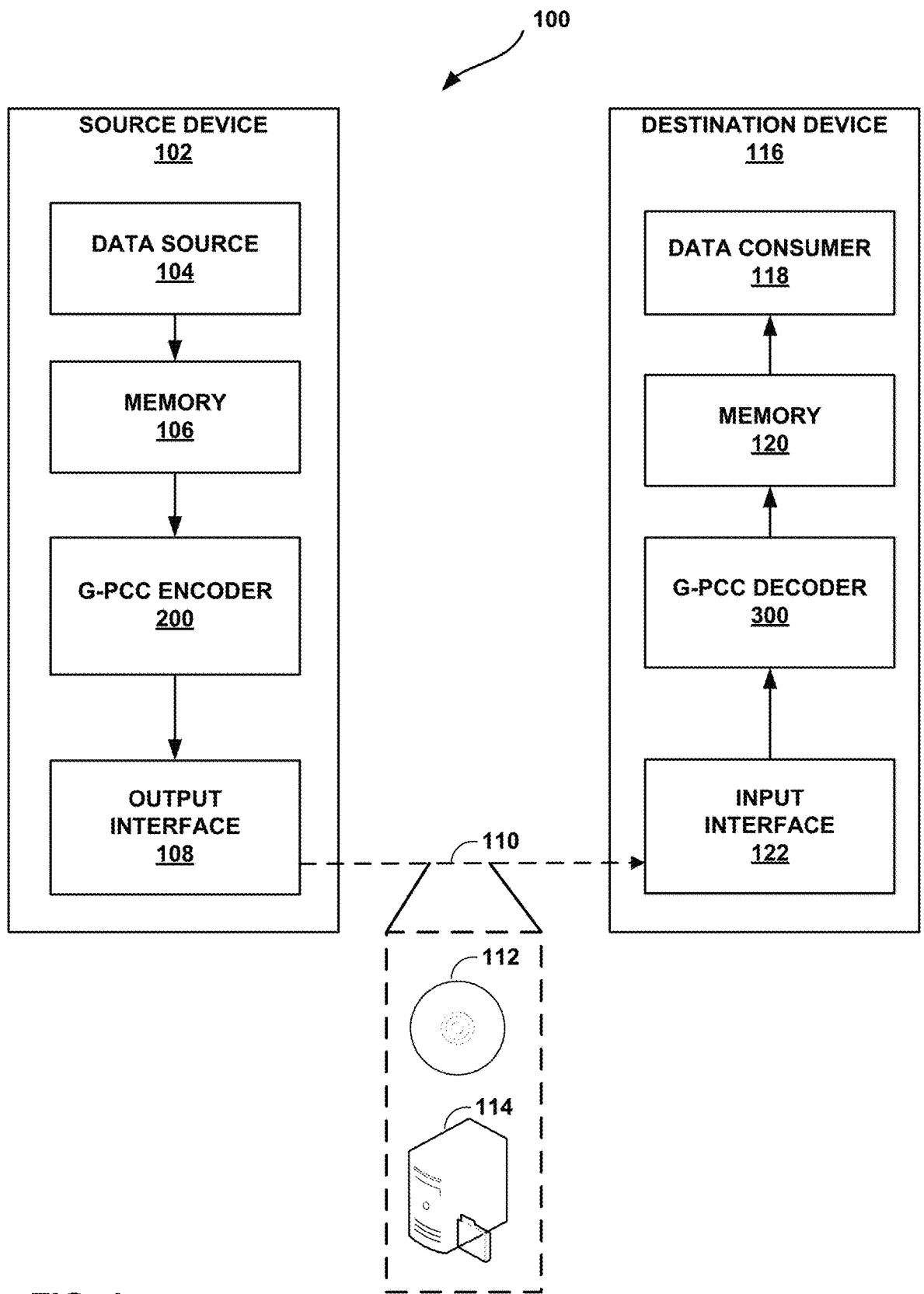
FIG. 1 is a block diagram illustrating an example encoding and decoding system that may perform the techniques of this disclosure.

A point cloud is a collection of points in a 3-dimensional (3D) space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

There have previously been two primary proposals for signaling the locations of points in a point cloud: octree coding and prediction-tree coding. As part of encoding point cloud data using octree coding, a G-PCC encoder may generate an octree. Each node of the octree corresponds to a cuboid space. Nodes of the octree can have zero child nodes or eight child nodes. In other examples, nodes can be divided into child nodes according to other tree structures. The child nodes of a parent correspond to equally sized cuboids within the cuboid corresponding to the parent node. The positions of individual points of a point cloud can be signaled relative to origin points of the nodes. If a node does not contain any points of the point cloud, the node is said to be unoccupied. If the node is unoccupied, it may not be necessary to signal additional data with respect to the node. Conversely, if a node contains one or more points of the point cloud, the node is said to be occupied.

When encoding point cloud data using prediction-tree coding, a G-PCC encoder determines a prediction mode for each point of the point cloud. The prediction mode for the point may be one of the following:

No prediction/zero prediction (0)
Delta prediction (p0)
Linear prediction (2*p0−p1)
Parallelogram prediction (2*p0+p1−p2)

In the case where the prediction mode for the point is "no prediction/zero prediction," the point is considered a root point (i.e., a root vertex) and the coordinates (e.g., x,y,z coordinates) of the point are signaled in a bitstream. In the case where the prediction mode for the point is "delta prediction," the G-PCC encoder determines a difference (i.e., delta) between the coordinates of the point and the coordinates of a parent point, such as a root point or other point. In the case where the prediction mode is "linear prediction," the G-PCC encoder determines predicted coordinates of the point using a linear prediction of the coordinates of two parent points. The G-PCC encoder signals a difference between the predicted coordinates determined using the linear prediction and the actual coordinates of the point. In the case where the prediction mode is "parallelogram prediction," the G-PCC encoder uses three parent points to determine predicted coordinates. The G-PCC encoder then signals a difference between (e.g., a "primary residual") the predicted coordinates and the actual coordinates of the point. The prediction relationships between the points essentially defines a tree of points.

It has been observed experimentally that octree coding may be more suitable for dense point clouds than prediction-tree coding. Point clouds acquired using 3D modeling are often dense enough such that octree coding works better. Point clouds acquired using LiDAR, however, for automotive applications for instance, tend to be somewhat coarse, and thus predictive coding may work better for these applications.

In some examples, an angular mode may be used to represent the coordinates of points in a spherical coordinates system. Because the conversion process between the spherical coordinate system and a Cartesian (e.g., x,y,z) coordinate system is not perfect, information may be lost. But since the G-PCC encoder can perform the conversion process, the G-PCC encoder can signal a "secondary residual" for a point that indicates the difference between the Cartesian coordinates of the point that result from applying the conversion process to spherical coordinates of the point and original Cartesian coordinates of the point.

This disclosure relates to a hybrid coding model in which both octree coding and direct coding are used to code a point cloud. For example, octree coding may be used initially to divide a space into nodes down to a specific level. Nodes at the specific level (and other occupied nodes of the octree that are not further split) may be referred to as "leaf nodes." Points within the volume of a leaf node may be coded using a "direct" coding mode.

When encoding the points of a leaf node in a "direct" coding mode, the G-PCC encoder may select an intra prediction mode for the leaf node or an inter prediction mode for the leaf node. The G-PCC encoder may signal whether the points of the leaf node are encoded using the intra prediction mode or the inter prediction mode.

If the G-PCC encoder selects the intra prediction mode for the leaf node, the G-PCC encoder may encode the points in the leaf node using prediction-tree coding in much the same manner as described above. That is, the G-PCC encoder may select from among the four prediction modes and signal coordinates for the points accordingly. However, rather than signaling the coordinates relative to an origin of the whole space associated with the octree, the G-PCC encoder may signal the coordinates relative to an origin point of the leaf node. This may improve coding efficiency, especially for root nodes.

If the G-PCC encoder selects the inter prediction mode for the leaf node, the G-PCC encoder may encode the points in the leaf node relative to a set of points in a reference frame. The reference frame may be a previously coded frame, analogous to a previous frame of a video. The G-PCC encoder may perform motion estimation to identify a set of points in the reference frame that have a similar spatial arrangement to the points in the leaf node. A motion vector for the leaf node indicates a displacement between the points of the leaf node and the identified set of points in the reference frame.

The G-PCC encoder may signal a set of parameters for the leaf node. The parameters for the leaf node may include a reference index that identifies a reference frame. The parameters for leaf node may also include a value indicating the number of points in the leaf node.

The parameters of the leaf node may also include residual values for each of the points in the leaf node. The residual values for a point in the leaf node indicate differences between predicted coordinates of the leaf node (as determined by adding the motion vector of the leaf node to a point in the reference frame corresponding to the point in the leaf node). In examples where the angular mode is used, the G-PCC encoder may also signal secondary residuals for the points.

In some examples, the parameters for the leaf node also includes a motion vector difference (MVD). The MVD indicates a difference between the motion vector of the leaf node and a predicted motion vector. The predicted motion vector is a motion vector of a neighboring node of the octree. The parameters for the leaf node may include an index that identifies the neighboring node.

In other examples, analogous to merge mode in conventional video coding, the parameters for the leaf node do not include the MVD, and the motion vector of the leaf node may be assumed to be the same as the motion vector of the identified neighboring node.

In some examples, signaling of the residual can be skipped. In some such examples where angular mode is used, signaling of the primary residuals can be skipped while still signaling the secondary residual.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to a hybrid-tree coding method combining octree coding and predictive coding for enhanced inter/intra prediction at the block level for point cloud compression. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to a hybrid-tree coding method combining octree coding and predictive coding for enhanced inter/intra prediction at the block level for point cloud compression. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors, and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in "Text of ISO/IEC FDIS 23090-9 Geometry-based Point Cloud Compression," ISO/IEC JTC 1/SC29/WG 7 MDS19617, Teleconference, October 2020, and a description of the codec is available in G-PCC Codec Description, ISO/IEC JTC 1/SC29/WG 7 MDS19620, Teleconference, October 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
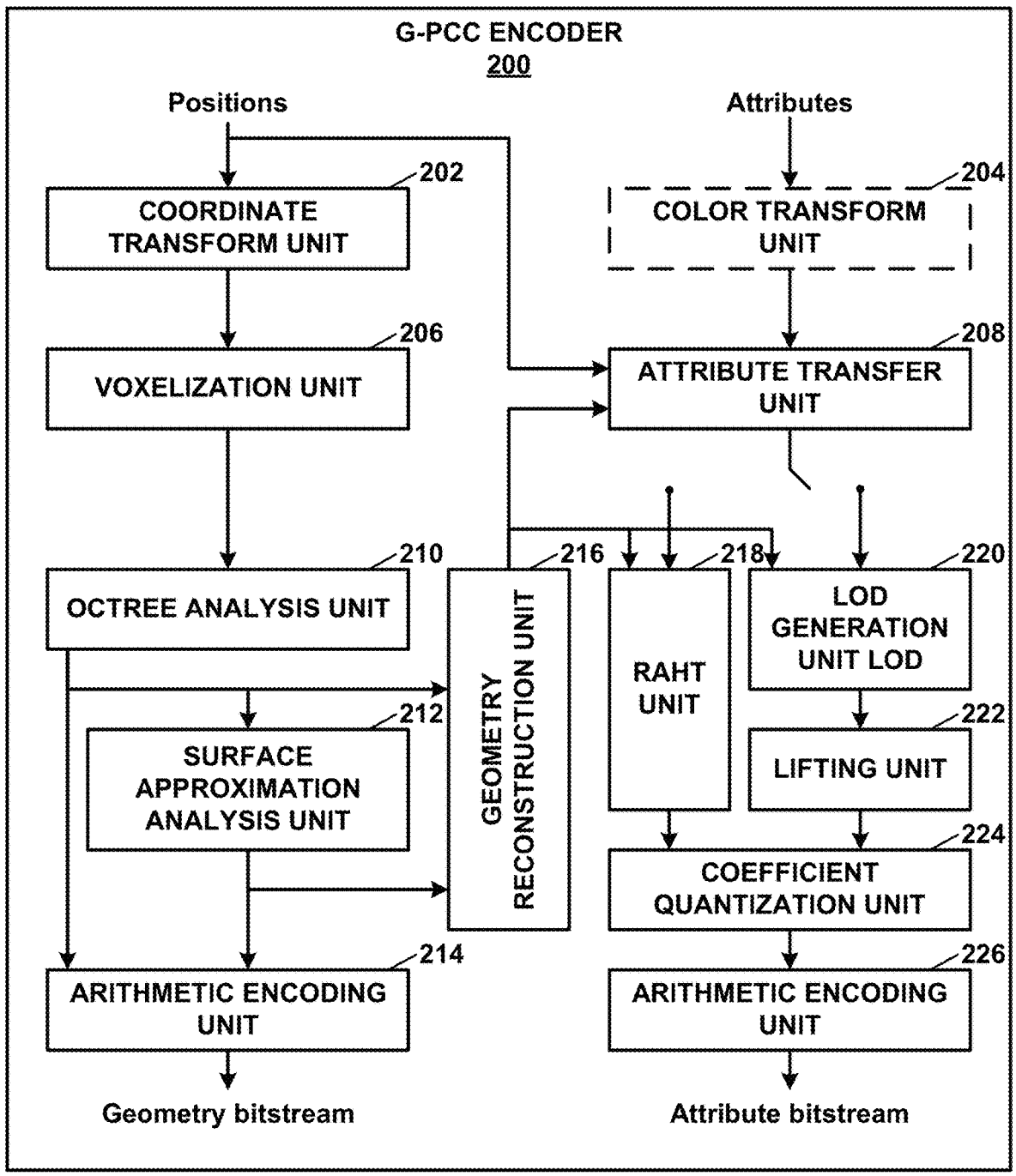
FIG. 2 is a block diagram illustrating an example Geometry Point Cloud Compression (G-PCC) encoder.
Figure 3:
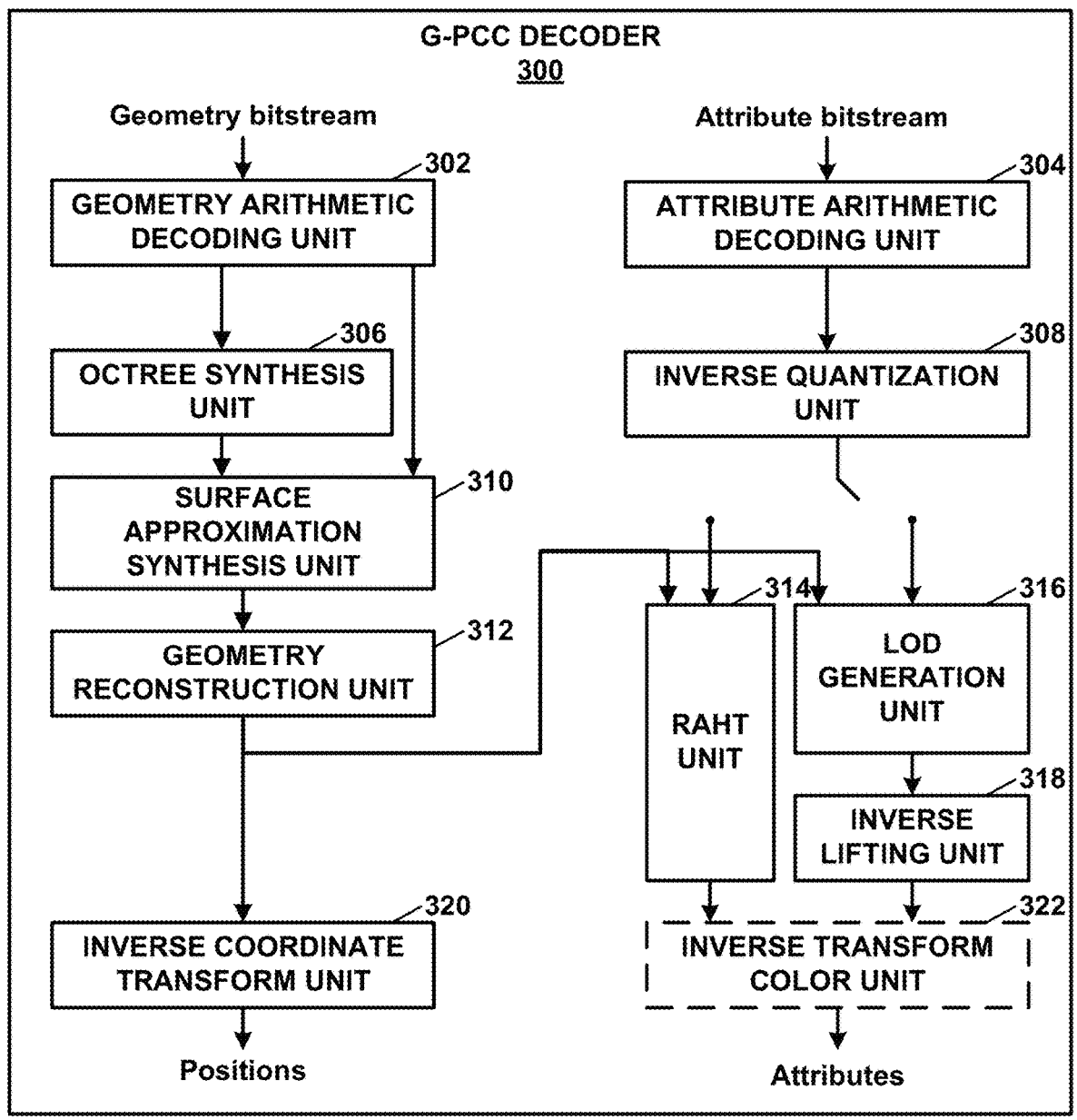
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. Surface approximation analysis unit 212 and RAHT unit 218 of FIG. 2 and surface approximation synthesis unit 310 and RAHT unit 314 of FIG. 3 are options typically used for Category 1 data. LOD generation unit 220 and lifting unit of 222 and LOD generation unit 316 and inverse lifting unit 318 of FIG. 3 are options typically used for Category 3 data. All the other modules are common between Categories 1 and 3.

For geometry, two different types of coding techniques exist: Octree and predictive-tree coding. In the following, this disclosure focuses on the octree coding. For Category 3 data, the compressed geometry is typically represented as an octree from the root all the way down to a leaf level of individual voxels. For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

Figure 4:
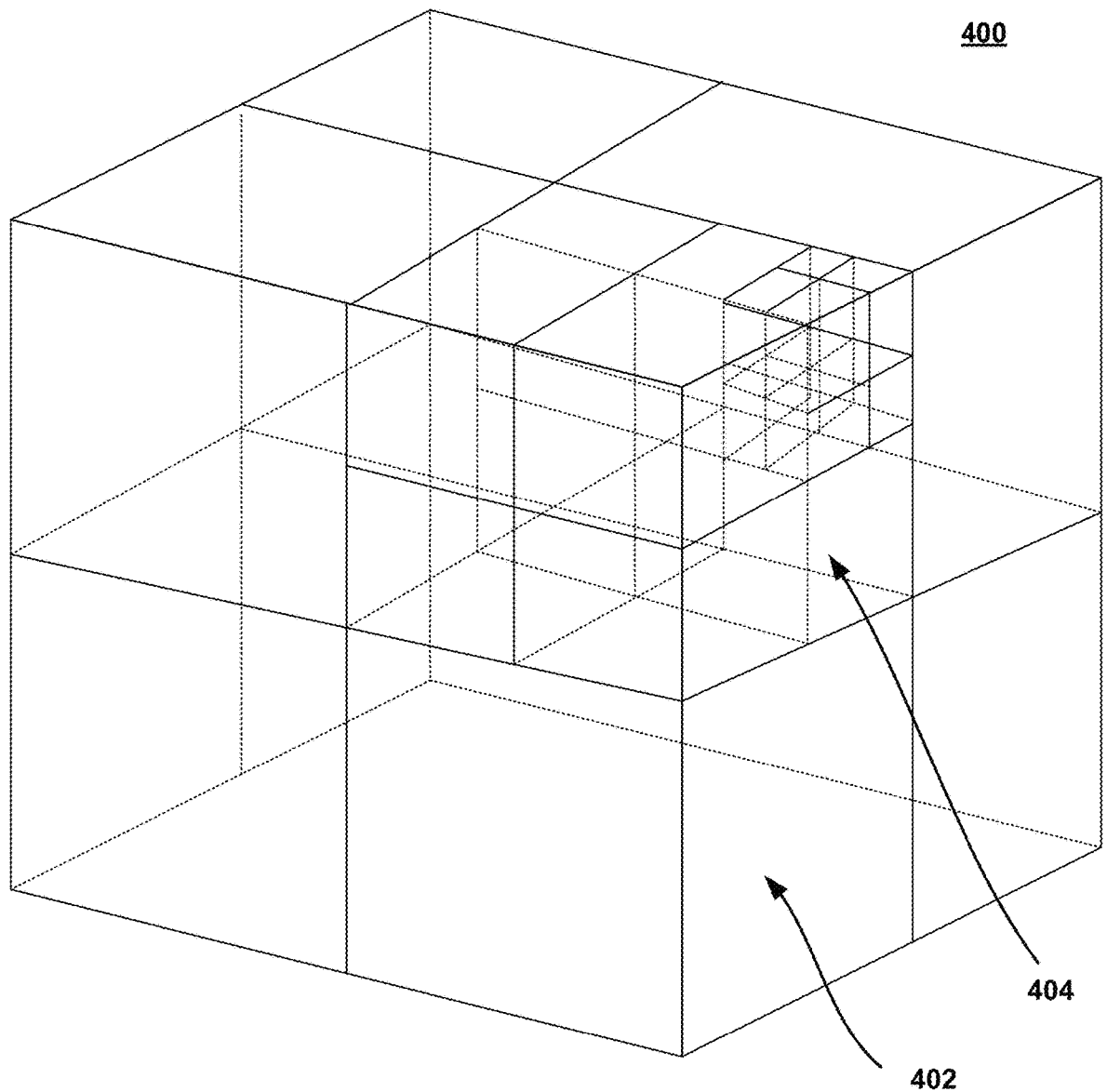
FIG. 4 is a conceptual diagram illustrating an example octree split for geometry coding.

FIG. 4 is a conceptual diagram illustrating an example octree split for geometry coding. Octree 400 includes 8 child nodes. Some of those child nodes, such as node 402, have no child nodes. Other of the child nodes, such as node 404, however, do have child nodes, and some of the child nodes of node 404 also have child nodes, and so on.

At each node of an octree, an occupancy is signaled (when not inferred) for one or more of the child nodes (up to eight nodes). Multiple neighborhoods are specified including (a) nodes that share a face with a current octree node, (b) nodes that share a face, edge, or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while Predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on a distance metric from the neighboring nodes or based on a sampling distance.

At G-PCC encoder 200, the residuals obtained as the output of the coding methods for the attributes are quantized. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may receive a set of positions and a set of attributes. The positions may include coordinates of points in a point cloud. The attributes may include information about points in the point cloud, such as colors associated with points in the point cloud.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform to transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point. Furthermore, octree analysis unit 210 may generate an octree based on the voxelized transform coordinates. Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in a geometry bitstream.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. Alternatively or additionally, LOD generation unit 220 and lifting unit 222 may apply LOD processing and lifting, respectively, to the attributes of the reconstructed points. RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in an attribute bitstream.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LoD generation unit 316, an inverse lifting unit 318, an inverse transform coordinate unit 320, and an inverse transform color unit 322.

G-PCC decoder 300 may obtain a geometry bitstream and an attribute bitstream. Geometry arithmetic decoding unit 302 of G-PCC decoder 300 may apply arithmetic decoding (e.g., Context-Adaptive Binary Arithmetic Coding (CABAC) or other type of arithmetic decoding) to syntax elements in the geometry bitstream. Similarly, attribute arithmetic decoding unit 304 may apply arithmetic decoding to syntax elements in the attribute bitstream.

Octree synthesis unit 306 may synthesize an octree based on syntax elements parsed from the geometry bitstream. In instances where surface approximation is used in the geometry bitstream, surface approximation synthesis unit 310 may determine a surface model based on syntax elements parsed from the geometry bitstream and based on the octree.

Furthermore, geometry reconstruction unit 312 may perform a reconstruction to determine coordinates of points in a point cloud. Inverse transform coordinate unit 320 may apply an inverse transform to the reconstructed coordinates to convert the reconstructed coordinates (positions) of the points in the point cloud from a transform domain back into an initial domain.

Additionally, in the example of FIG. 3, inverse quantization unit 308 may inverse quantize attribute values. The attribute values may be based on syntax elements obtained from the attribute bitstream (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. Alternatively, LOD generation unit 316 and inverse lifting unit 318 may determine color values for points of the point cloud using a level of detail-based technique.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality and are preset on the operations that can be performed. Programmable circuits refer to circuits that can be programmed to perform various tasks and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Predictive geometry coding was introduced as an alternative to the octree geometry coding, where the nodes are arranged in a tree structure (which defines the prediction structure), and various prediction strategies are used to predict the coordinates of each node in the tree with respect to its predictors.

Figure 5:
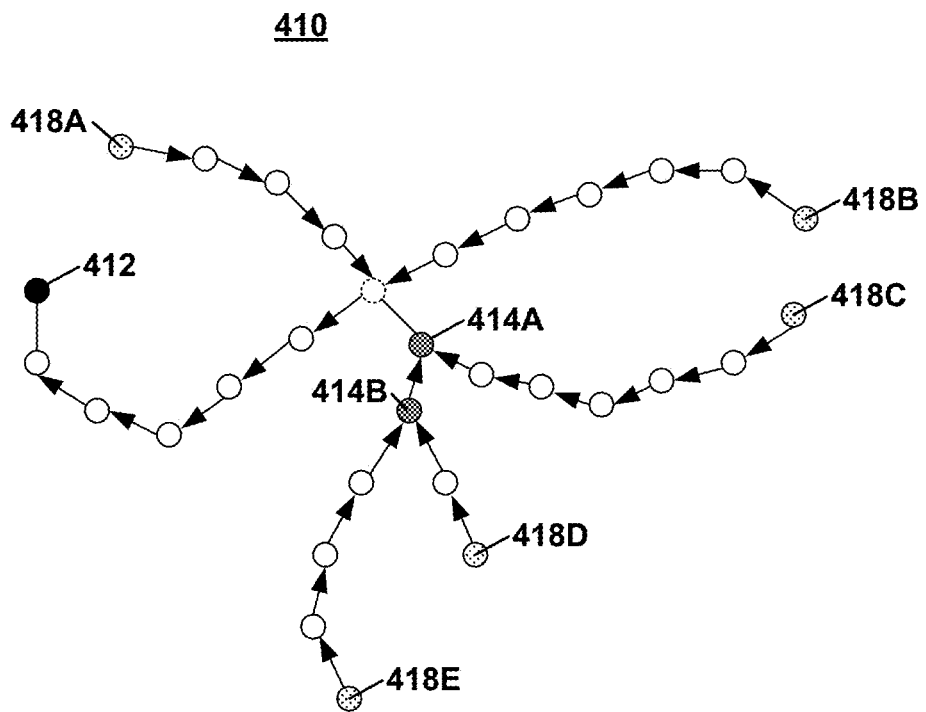
FIG. 5 is a conceptual diagram illustrating an example of a prediction tree.

FIG. 5 shows an example of prediction tree 401, which is represented as a directed graph where the arrow point to the prediction direction. The node 412 is the root vertex and has no predictors. Nodes 414A and 414B have two children. The dashed-line node has 3 children. The white-filled nodes have one child, and nodes 418A-418E are leaf nodes that have no children. Every node has only one parent node.

Four prediction strategies are specified for each node based on its parent (p0), grand-parent (p1) and great-grand-parent (p2):

No prediction/zero prediction (0)
Delta prediction (p0)
Linear prediction (2*p0−p1)

Parallelogram prediction (2*p0+p1−p2)

G-PCC encoder 200 may employ any algorithm to generate the prediction tree; the algorithm used may be determined based on the application/use case and several strategies may be used. Some strategies are described in G-PCC Codec Description, ISO/IEC JTC 1/SC29/WG 7 MDS19620, Teleconference, October 2020.

For each node, the residual coordinate values are coded in the bitstream starting from the root node in a depth-first manner.

Predictive geometry coding is useful mainly for Category 3 (LIDAR-acquired) point cloud data, e.g., for low-latency applications.

Angular mode may be used in predictive geometry coding, where the characteristics of LIDAR sensors may be utilized in coding the prediction tree more efficiently. The coordinates of the positions are converted to the (r, φ, i) (radius, azimuth, and laser index) and a prediction is performed in this domain (the residuals are coded in r, φ, i domain). Due to the errors in rounding, coding in r, φ, i is not lossless and hence a second set of residuals are coded which correspond to the Cartesian coordinates. A description of the encoding and decoding strategies used for angular mode for predictive geometry coding is reproduced below from G-PCC Codec Description, ISO/IEC JTC 1/SC29/WG 7 MDS19620, Teleconference, October 2020.

Figure 6:
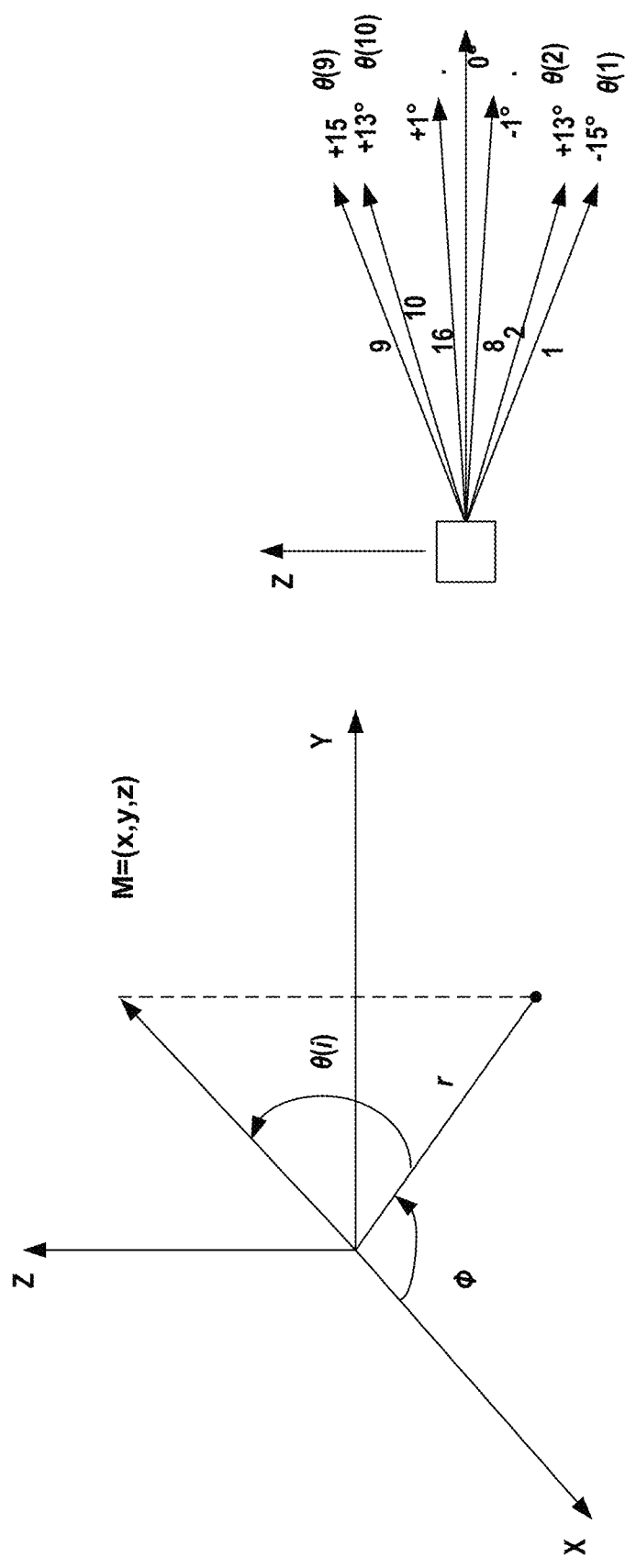
FIG. 6 is a conceptual diagram illustrating an example spinning Lidar acquisition model.

The method focuses on point clouds acquired using a spinning Lidar model. Here, the Lidar has N lasers (e.g., N=16, 32, 64) spinning around the Z axis according to an azimuth angle φ (see FIG. 6). Each laser may have different elevation $\theta(i)_{i=1...N}$ and height $\varsigma(i)_{i=1...N}$. Suppose that the laser i hits a point M, with Cartesian integer coordinates (x,y,z), defined according to the coordinate system described in FIG. 6.

This method provides for modelling of the position of M with three parameters (r, φ, i), which are computed as follows:

$$r = \sqrt{x^2 + y^2}$$

$$\phi = \text{atan2}(y, x)$$

$$i = \arg\min_{j=1...N}\{z + \varsigma(j) - r \times \tan(\theta(j))\},$$

More precisely, the method uses the quantized version of (r, φ, i), denoted ($\tilde{r}$, $\tilde{\phi}$, i), where the three integers $\tilde{r}$, $\tilde{\phi}$ and i are computed as follows:

$$\tilde{r} = \text{floor}\left(\frac{\sqrt{x^2+y^2}}{q_r} + o_r\right) = \text{hypot}(x, y)$$

$$\tilde{\phi} = \text{sign}(\text{atan2}(y,x)) \times \text{floor}\left(\frac{|\text{atan2}(y,x)|}{q_\phi} + o_\phi\right)$$

$$i = \arg\min_{j=1...N}\{z + \varsigma(j) - r \times \tan(\theta(j))\}$$

where:
  ($q_r$, $o_r$) and ($q_\theta$, $o_\phi$) are quantization parameters controlling the precision of $\tilde{\phi}$ and $\tilde{r}$, respectively.
  sign(t) is the function that return 1 if t is positive and (−1) otherwise.
  |t| is the absolute value of t.

To avoid reconstruction mismatches due to the use of floating-point operations, the values of $\varsigma(i)_{i=1...N}$ and $\tan(\theta(i))_{i=1...N}$ are pre-computed and quantized as follows:

$$\tilde{z}(i) = \text{sign}(\varsigma(i)) \times \text{floor}\left(\frac{|\varsigma(i)|}{q_\varsigma} + o_\varsigma\right)$$

$$\tilde{t}(i) = \text{sign}\left(\varsigma(\tan(\theta(j))) \times \text{floor}\left(\frac{|\tan(\theta(j))|}{q_\theta} + o_\theta\right)\right)$$

where:
  ($q_\varsigma$, $o_\varsigma$) and ($q_\theta$, $o_\theta$) are quantization parameters controlling the precision of $\tilde{\varsigma}$ and $\tilde{\theta}$, respectively.

The reconstructed cartesian coordinates are obtained as follows:

$$\hat{x} = \text{round}(\tilde{r} \times q_r \times \text{app\_cos}(\tilde{\phi} \times q_\phi))$$

$$\hat{y} = \text{round}(\tilde{r} \times q_r \times \text{app\_sin}(\tilde{\phi} \times q_\phi))$$

$$\hat{z} = \text{round}(\tilde{r} \times q_r \times \tilde{t}(i) \times q_\theta - \tilde{z}(i) \times q_\varsigma),$$

where app_cos(.) and app_sin(.) are approximation of cos(.) and sin(.). The calculations could be using a fixed-point representation, a look-up table and linear interpolation.

Note that ($\hat{x}$, $\hat{y}$, $\hat{z}$) may be different from (x,y,z) due to various reasons:
  quantization
  approximations
  model imprecision
  model parameters imprecisions Let ($r_x$, $r_y$, $r_z$) be the reconstruction residuals defined as follows:

$$r_x = x - \hat{x}$$

$$r_y = y - \hat{y}$$

$$r_z = z - \hat{z}$$

In this method, the encoder (e.g., G-PCC encoder 200) proceeds as follows:
  Encode the model parameters $\tilde{t}(i)$ and $\tilde{z}(i)$ and the quantization parameters $q_r$, $q_\varsigma$, $q_\theta$ and $q_\phi$
  Apply the geometry predictive scheme described in Text of ISO/IEC FDIS 23090-9 Geometry-based Point Cloud Compression, ISO/IEC JTC 1/SC29/WG 7 MDS19617, Teleconference, October 2020, to the representation ($\tilde{r}$, $\tilde{\phi}$, i)
    A new predictor leveraging the characteristics of lidar could be introduced. For instance, the rotation speed of the lidar scanner around the z-axis is usually constant. Therefore, the current $\tilde{\phi}(j)$ may be predicted as follows:

$$\tilde{\phi}(j) = \tilde{\phi}(j-1) + n(j) \times \delta_\phi(k)$$

Where
    $(\delta_\phi(k))_{k=1...K}$ is a set of potential speeds the encoder could choose from. The index k could be explicitly written to the bitstream or could be inferred from the context based on a deterministic strategy applied by both the encoder and the decoder, and
    n(j) is the number of skipped points which may be explicitly written to the bitstream or may be inferred from the context based on a deterministic strategy applied by both the encoder and the decoder. n(j) may also be referred to as a "phi multiplier" later, and in some implementations, may be used only with a delta predictor.

Encode with each node the reconstruction residuals ($r_x$, $r_y$, $r_z$)

G-PCC decoder 300 proceeds as follows:

Decodes the model parameters $\tilde{t}(i)$ and $\tilde{z}(i)$ and the quantization parameters $q_r$, $q\varsigma$, $q_\phi$ and $q_\phi$ Decodes the ($\tilde{r}$, $\tilde{\phi}$, i) parameters associated with the nodes according to the geometry predictive scheme described in Text of ISO/IEC FDIS 23090-9 Geometry-based Point Cloud Compression, ISO/IEC JTC 1/SC29/WG 7 MDS19617, Teleconference, October 2020.

Computes the reconstructed coordinates ($\hat{x}$, $\hat{y}$, $\hat{z}$) as described above Decodes the residuals ($r_x$, $r_y$, $r_z$)

As discussed in the next section, lossy compression could be supported by quantizing the reconstruction residuals ($r_x$, $r_y$, $r_z$)

Compute the original coordinates (x,y,z) as follows $$x = r_x + \hat{x}$$

$$y = r_y + \hat{y}$$

$$z = r_z + \hat{z}$$

Lossy compression may be achieved by applying quantization to the reconstruction residuals ($r_x$, $r_y$, $r_z$) or by dropping points.

The quantized reconstruction residuals are computed as follows:

$$\tilde{r}_x = \text{sign}(r_x) \times \text{floor}\left(\frac{|r_x|}{q_x} + o_x\right)$$

$$\tilde{r}_y = \text{sign}(r_y) \times \text{floor}\left(\frac{|r_y|}{q_y} + o_y\right)$$

$$\tilde{r}_z = \text{sign}(r_z) \times \text{floor}\left(\frac{|r_z|}{q_z} + o_z\right)$$

Where ($q_x$, $o_x$), ($q_y$, $o_y$) and ($q_z$, $o_z$) are quantization parameters controlling the precision of $\tilde{r}_x$, $\tilde{r}_y$ and $\tilde{r}_z$, respectively.

Trellis quantization could be used to further improve the RD (rate-distortion) performance results.

The quantization parameters may change at sequence/frame/slice/block level to achieve region adaptive quality and for rate control purposes.

G-PCC encoder 200 may be configured to perform motion estimation for inter-prediction. The following describes the motion estimation (global and local) process applied in InterEM software. InterEM is based on octree-based coding extension for inter-prediction. Although, the motion estimation is applied to octree-based framework, similar process (or at least a part of it) may also be applicable to predictive geometry coding.

There are two kinds of motion involved in G-PCC InterEM software: global motion matrix and local node motion vector. Global motion parameters include a rotation matrix and translation vector that can be applied to all the points in prediction (reference) frame. Local node motion vector of a node of the octree is a motion vector that is only applied on points within the node in prediction (reference) frame. Details of motion estimation algorithm in InterEM is described below.

Figure 7:
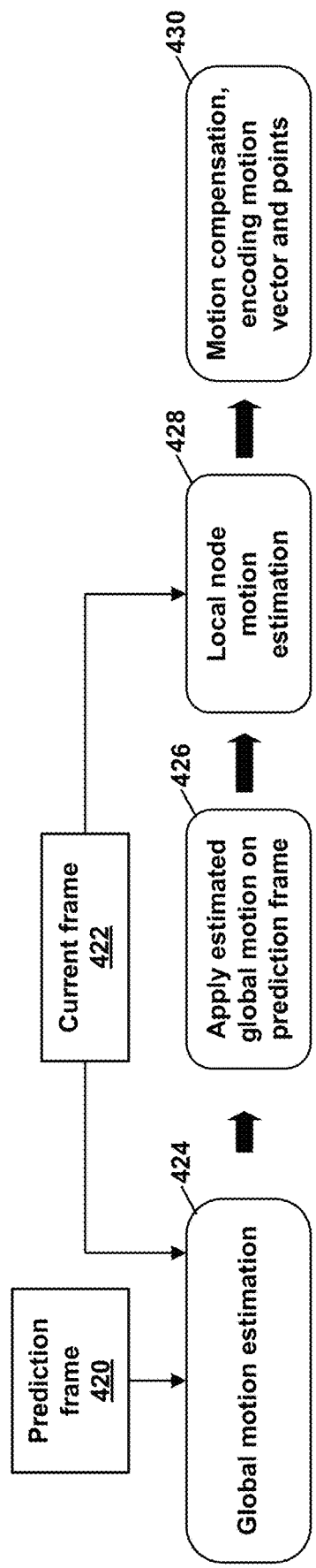
FIG. 7 is a conceptual diagram illustrating an example motion estimation flowchart for InterEM.

FIG. 7 shows a flow chart illustrating a motion estimation process. The inputs to the process include a prediction frame 420 and a current frame 422. G-PCC encoder 200 estimates global motion first at a global scale (424). After applying the estimated global motion to prediction frame 420 (426), G-PCC encoder 200 estimates local motion at a finer scale, node level in octree (428). Finally, G-PCC encoder 200 applies motion compensation to the estimated local node motion and encodes the determined motion vectors and points (430).

Aspects of FIG. 7 are explained in greater detail below. G-PCC encoder 200 may perform a process to estimate global motion matrix and a translation vector. In InterEM software, a global motion matrix is defined to match feature points between a prediction frame (reference) and the current frame.

Figure 8:
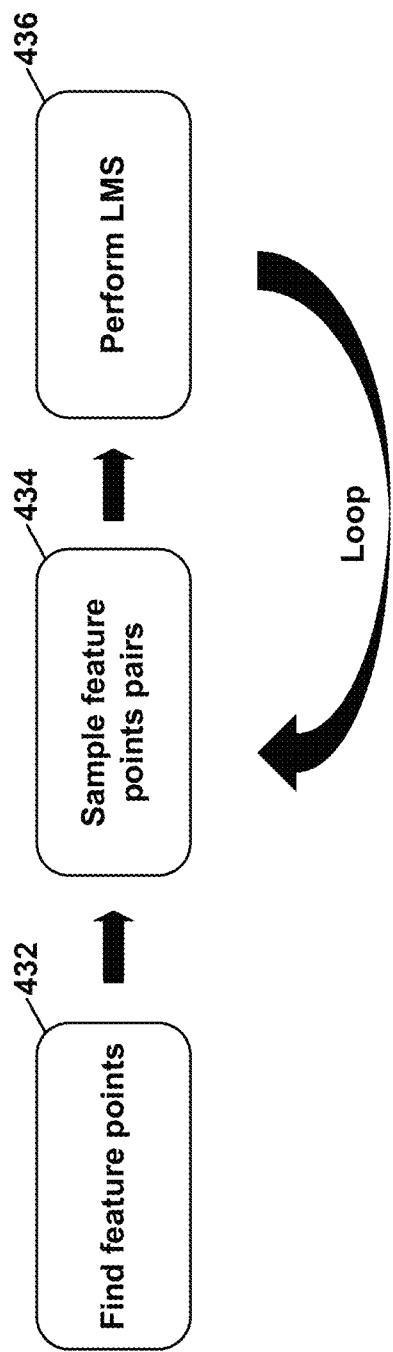
FIG. 8 is a conceptual diagram illustrating an example algorithm for estimation of global motion.

FIG. 8 illustrates an example of a global motion estimation process, which may be performed by G-PCC encoder 200. In the example of FIG. 8, G-PCC encoder 200 finds feature points (432), samples feature points (434), and performs motion estimation using a Least Mean Square (LMS) algorithm (436).

In the algorithm illustrated by FIG. 8, points that have a large position change between the prediction frame and the current frame may be defined to be feature points. For each point in the current frame, the closest point in the prediction frame is found, and point pairs are built between the current frame and the prediction frame. If the distance between the paired points is greater than a threshold, the paired points are regarded as feature points.

After finding the feature points, a sampling on the feature points is performed to reduce the scale of the problem (e.g., by choosing a subset of feature points to reduce the complexity of motion estimation). Then, the LMS algorithm is applied to derive motion parameters by trying to reduce the error between respective features points in the prediction frame and the current frame.

Figure 9:
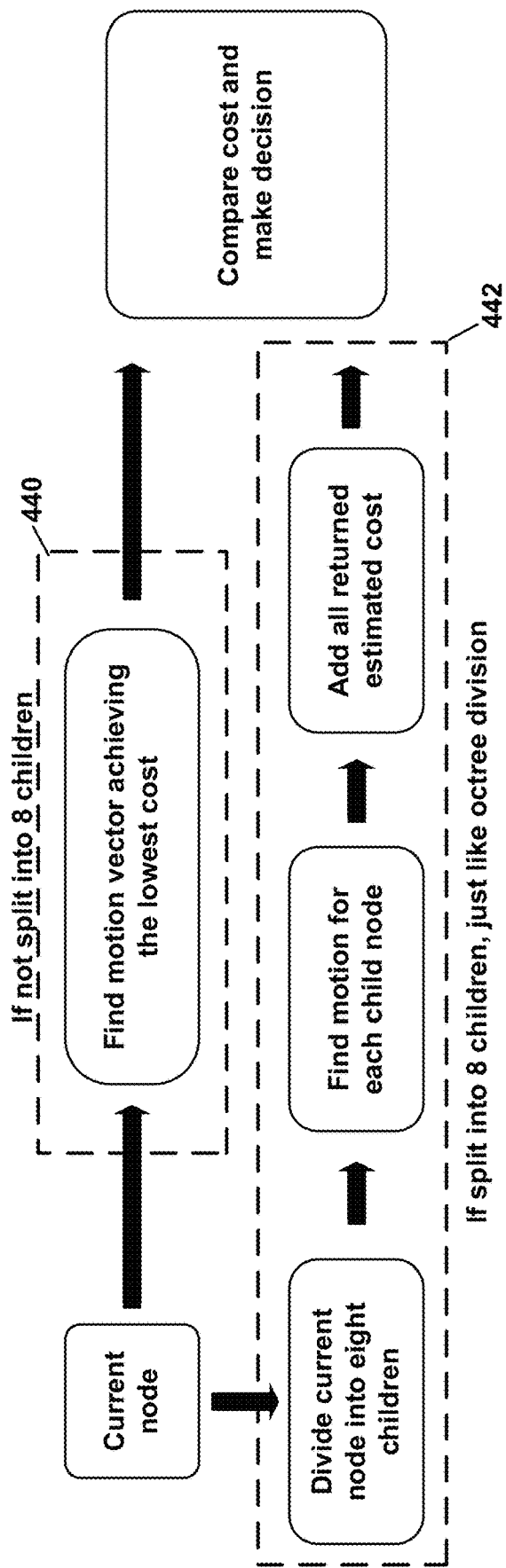
FIG. 9 is a conceptual diagram illustrating an example algorithm for estimation of a local node motion vector.

FIG. 9 illustrates an example process for estimating a local node motion vector. In the local node estimation algorithm shown in FIG. 9, the motion vector is estimated in a recursive manner. The cost function used for choosing the best suitable motion vector may be based on the Rate-Distortion cost. In FIG. 9, path 440 shows the process for a current node that is not split into 8 children, and path 442 shows the process for a current node that is split into 8 children.

If a current node is not split into 8 children (440), the motion vector that could result in the lowest cost between the current node and the prediction node is determined. If the current node is divided into 8 children (442), the motion estimation algorithm is applied and the total cost under the split condition is obtained by adding the estimated cost value of each child node. The decision whether to split or not to split is arrived by comparing the cost between splitting and not splitting; if split, each sub-node is assigned its respective motion vector (or may be further split to its children), if not split, the current node is assigned the motion vector.

Two parameters that affect the performance of motion vector estimation are block size (BlockSize) and minimum prediction unit size (MinPUSize). BlockSize defines the upper bound of node size to apply motion vector estimation and MinPUSize defines the lower bound.

The InterEM software fundamentally being an octree-coder performs occupancy prediction, and while doing occupancy prediction, uses the information of global/local motion and the reference point cloud. Thus, the InterEM software does not perform direct motion compensation of points, which may, for example, include applying motion to the points in the reference frame to project the points to the current frame. The difference between actual and predicted point may then be coded, which may be more effective in performing inter-prediction.

One or more techniques disclosed in this document may be applied independently or combined. This disclosure proposes techniques to perform direct motion compensation while still benefiting from the flexible octree partitioning based coding structure. In the following, the techniques are primarily shown in the context of octree-splitting but can also be extended to OTQTBT (octree-quadtree-binary tree) splitting scenario.

G-PCC encoder 200 and/or G-PCC decoder 300 may be configured to perform high-level splitting and to process a mode flag. In one example of the disclosure, G-PCC encoder 200 and/or G-PCC decoder 300 may be configured to perform octree-based splitting (for the occupancy prediction) on the current point-cloud. However, it is possible to stop octree-splitting at some level, and then directly code the points inside that octree-leaf volume (hereafter this is referred to as "direct prediction") instead of coding the occupancy. A leaf node size, or an octree depth value may be signaled to specify the level at which octree-splitting is stopped and the points are coded as octree-leaf volume.

For each such octree leaf node, where the octree splitting stops, and "direct prediction" is activated, a flag may be signaled to indicate whether the set of points inside octree-leaf volume is intra or inter predicted. In geometry parameter set, maximum and minimum size for octree-leaf can be defined.

Figure 10:
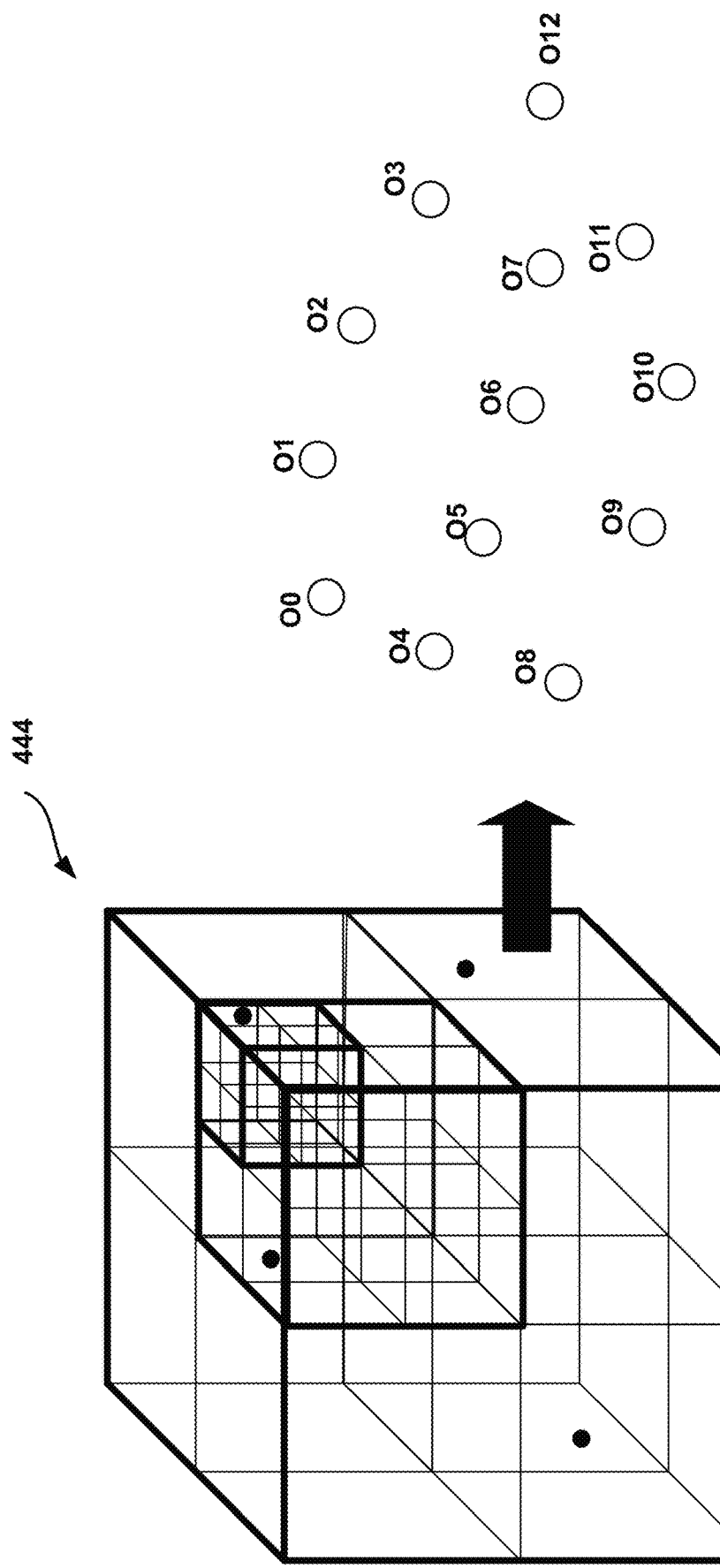
FIG. 10 is a conceptual diagram illustrating an example of high-level octree splitting.
Figure 11:
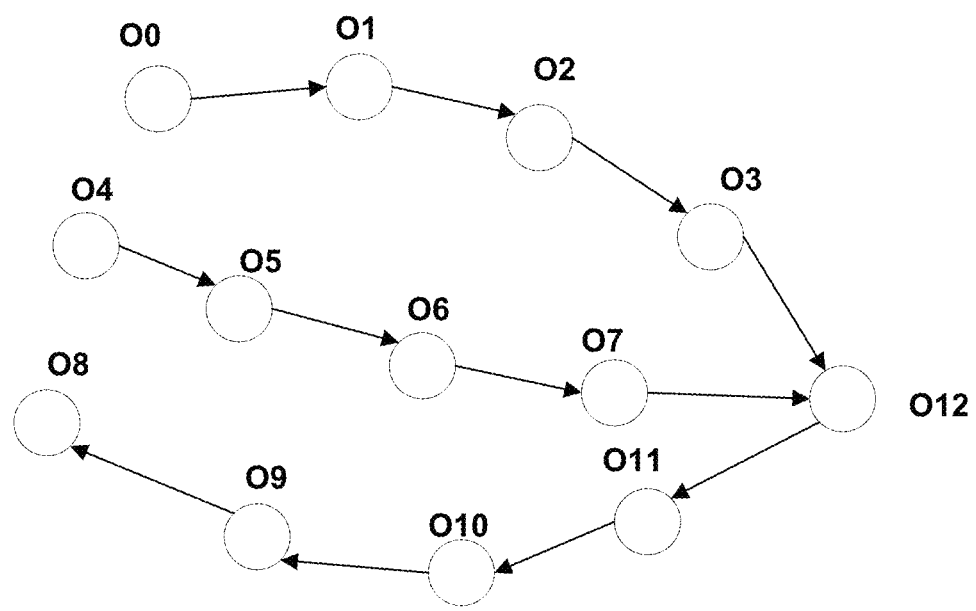
FIG. 11 is a conceptual diagram illustrating an example of local predictive tree generation.

FIG. 10 is a conceptual diagram illustrating high-level octree splitting of octree 444. FIG. 10 is an example of an octree-leaf node for direct prediction containing 13 points (O0 through O12). In a special case, the root node of the octree (no splitting) can be coded using the "direct prediction."

G-PCC encoder 200 and/or G-PCC decoder 300 may be configured to perform intra prediction. When the flag value is set to intra, all the points inside the volume are intra-predicted. For this, a "local predictive tree" is generated. The generation of such tree is non-normative (the points can be traversed in a different order such as with azimuth, Morton, radial or in some other order). For each point, its prediction mode (0, 1, 2, 3), number of child information, primary residual and secondary residual (if angular mode is enabled) is signaled. So, in summary, intra prediction is similar to the predictive geometry coding in its functionality.

Alternatively, also, a single prediction mode is signaled for all the points in the octree-leaf volume, which may reduce the associated signaling cost. The radius value (if angular mode enabled) or (x,y,z) value (if angular mode disabled) for the zero predictor may be set to, for example, the left-top point inside the octree-leaf volume. Alternatively, the zero predictor may be signaled for the octree-leaf volume, or an index may be signaled indicating the point to use for the zero predictor inside the octree-leaf volume. Moreover, a clipping may be performed after performing the prediction/reconstruction if the values are outside of the octree-leaf volume.

The syntax table for intra-prediction may be similar to the syntax described for predictive-tree in Text of ISO/IEC FDIS 23090-9 Geometry-based Point Cloud Compression, ISO/IEC JTC 1/SC29/WG 7 MDS19617, Teleconference, October 2020, the entire content of which is incorporated by reference.

G-PCC encoder 200 and/or G-PCC decoder 300 may be configured to perform inter prediction. Assuming that the octree-leaf has N points inside: (O(0), . . . , O(N−1)), for inter-prediction, motion estimation is performed at the encoder side with current set of points in octree-leaf volume and finding the best match with a similar set of points in the reference point cloud frame (where reference point cloud could be either motion uncompensated or global motion compensated). For inter-prediction of the octree-leaf, the following is signaled:
  i. the reference index (if there are multiple reference point cloud frames to predict from)
  ii. motion vector difference (MVD). (difference between actual and predicted MV (as described above with respect to performing MV prediction from neighbors))
  iii. Number of points in the octree-leaf (N).
  iv. Primary (and if angular mode enabled also secondary) residual (tuplet, difference between 3D co-ordinate) for N points (R'i).

Figure 12:
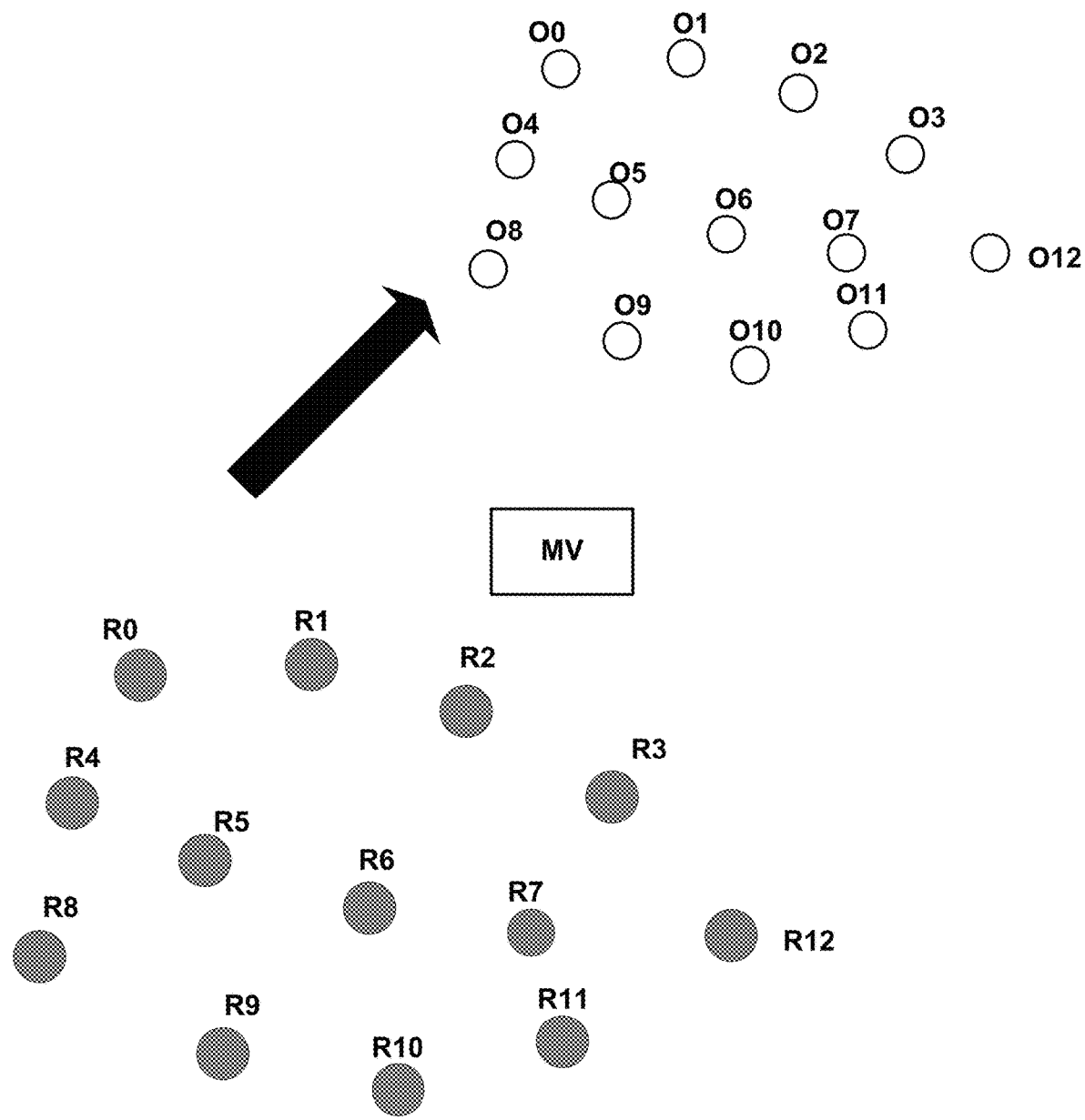
FIG. 12 is a conceptual diagram illustrating an example current set of points (O0 through O12) and a reference set of points (R0 through R12) with N=M=13.
Figure 13:
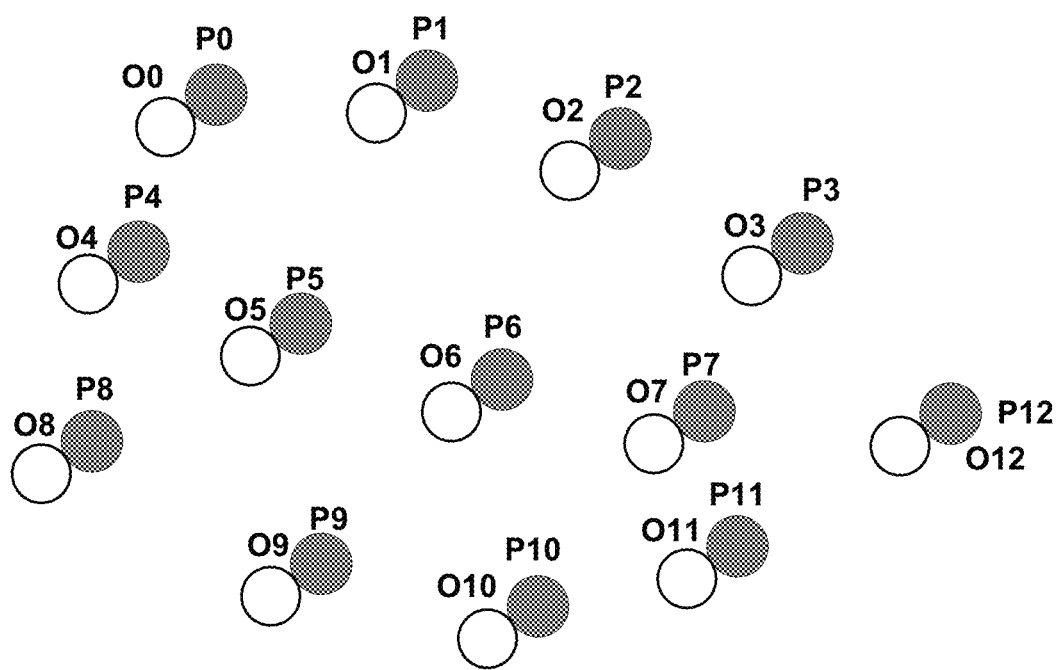
FIG. 13 is a conceptual diagram illustrating an example current set of points and a motion compensated reference set of points with N=M=13.

In the following, this disclosure describes the motion compensation process given a signaled reference index (if applicable) and MV for an octree-node.
  a. The current octree-leaf has its top left point at (X0, Y0, Z0) and dimension as (Sx, Sy, Sz), and the motion vector is MV=(MVx, MVy, MVz). So, the corresponding reference block in the reference point cloud frame is with top left at (Xr, Yr, Zr)=(X0−MVx, Y0−MVy, Z0−MVz), and size of (Sx, Sy, Sz)
  b. Fetch all the points inside this reference block and arranged in a 1D array, the ordering may be predetermined/fixed or signaled, for example, for the octree-leaf. Let say, there are M such points with co-ordinate (in reference frame): (R0, . . . R(M−1)), where Ri is a triplet providing 3D co-ordinate of i-th point. For i=0 . . . (M−1)) as shown in FIG. 12.
  c. All the points are motion compensated by applying the signaled MV, which is used as a predicted geometry position (Pi), i.e., Pi=Ri+MV, as shown in FIG. 13.
  d. If angular mode is enabled, for all M points, the corresponding ($\tilde{r}$, $\phi$, i) is derived.

In FIG. 12, the current set of points are labeled O0 through O12 and the reference set of points are labeled R0 through R12, with N=M=13. In FIG. 13, the current set of points are labeled O0 through O12 and the motion compensated reference set of points are labeled P0 through P12, with N=M=13.

Now, there may be three scenarios:
  i. N=M (the current octree-node and reference block has same number of points).
  ii. N>M.
  iii. N<M.

A first scenario where N=M, will now be described. The residual (primary and if applicable secondary residual) is directly added to the motion compensated points to generate the reconstruction=Pi+R'i.

A second scenario, where N>M, will now be described. The motion compensated points in 1D array (Pi) is extended using last value P(M−1), i.e., [P'0, . . . P'(M−1), P'(M), . . . P'(N−1)]=[P0, P(M−1), P(M−1), . . . P(M−1)], and then residuals are directly added to generate the reconstruction=P'i+R'i. Alternatively, the zero predictor is used for the extension.

A third scenario, where N<M, will now be described. The residuals are directly added to the first N point, i.e., [P0, . . . P(N−1)] to generate the reconstruction=Pi+Ri.

G-PCC encoder 200 and/or G-PCC decoder 300 may be configured to perform MV prediction from neighbors. It is possible to predict the MV of the current octree-leaf from MV of spatio-temporal neighboring inter octree-leaf, and a corresponding MV difference may be signaled. A MV prediction index may be signaled in case there are multiple spatio-temporal candidates. It is also possible to add previously used MV candidates in the MV candidate list, which is based on recent history, in addition to spatio-temporal neighbor candidates.

It is also possible to merge the MV information with spatio-temporal neighboring by specifying a signaled "merge flag". A merge index may be signaled in case there are multiple spatio-temporal candidate.

G-PCC encoder 200 and/or G-PCC decoder 300 may be configured to perform skipping primary residual For good inter-prediction, the primary residual, which is applicable when angular mode is enabled, is typically small or even close to zero. In such cases, it is also possible to skip the primary residual entirely for all points in the octree-leaf volume. So, a primary_residual_skip flag may be signaled for the octree-leaf volume. In this case, the difference between original points and predicted points are entirely coded in secondary residual.

Alternatively, the primary_residual_skip_flag may be signaled at octree levels higher than the octree-leaf volume and applies to one or more octree leaves that are associated with the octree level.

The table below is a syntax table for inter-predicted octree-leaf.

```
Octree_leaf(X0, Y0, Z0){
    if(number_of_references > 1)
        ref_idx                                         ae(v)
    num_points_minus1                                   ae(v)
    merge_flag                                          ae(v)
    if(!merge_flag) {
        mvp_idx                                         ae(v)
        for( i = 0 ; i < 3; i++){
            abs_mvd[i]                                  ae(v)
            if(!abs_mvd[i])
                mvd_sign[i]                             ae(v)
        }
    }
    else
        merge_idx                                       ae(v)
    if(geom_angular_enabled_flag)
        primary_residual_skip_flag                      ae(v)
    for(n = 0; n <= num_points_minus1; n++){
        for( i = 0 ; i < 3; i++){
            If(!primary_residual_skip_flag) {
                abs_primary_residual[n][i]              ae(v)
                if(!abs_primary_residual[n][i])
                    primary_residual_sign[n][i]         ae(v)
            }
            abs_secondary_residual[n][i]                ae(v)
            if(!abs_secondary_residual[n][i])
                secondary_residual_sign[n][i]           ae(v)
        }
    }
}
```

Examples in the various aspects of this disclosure may be used individually or in any combination.

Figure 14:
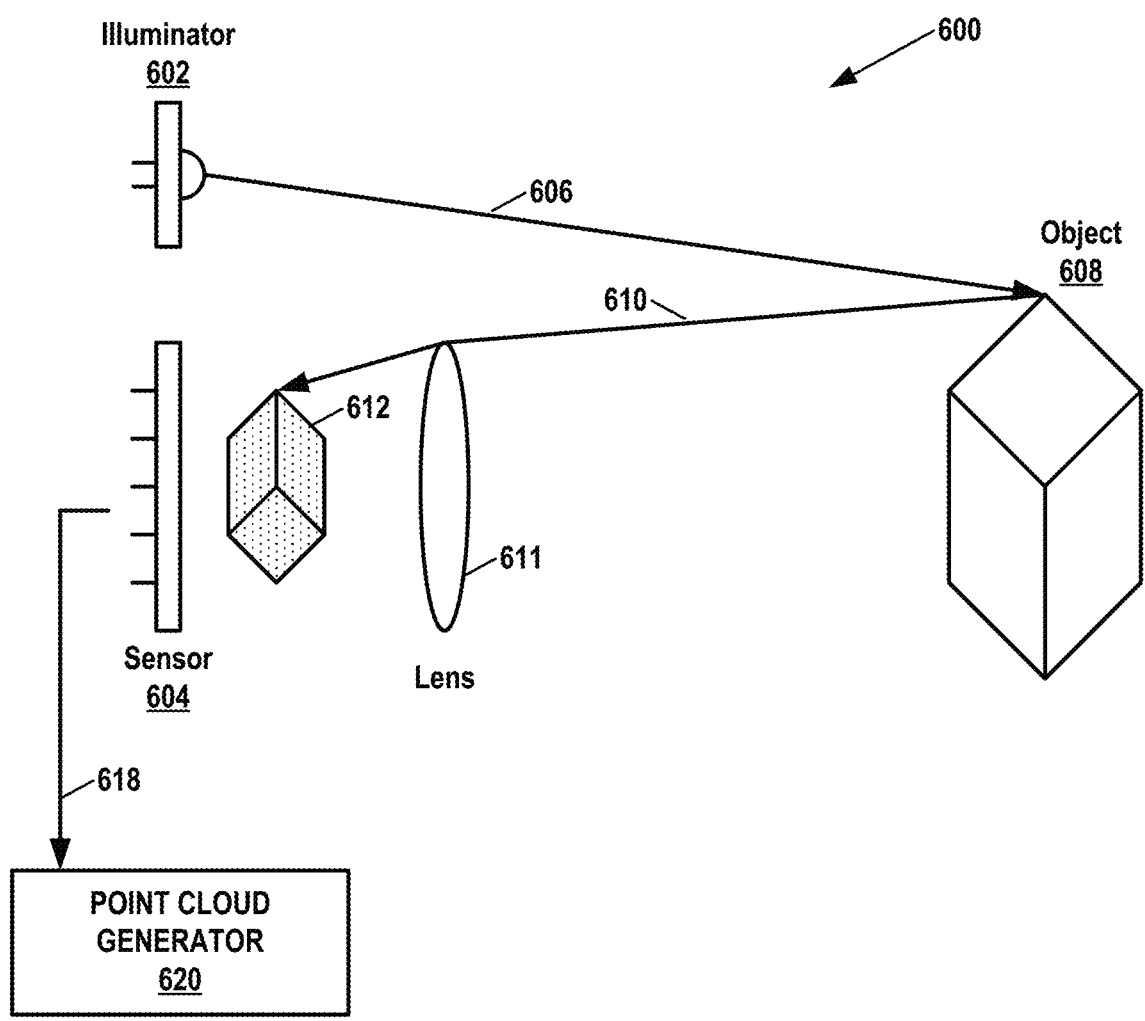
FIG. 14 is a conceptual diagram illustrating an example range-finding system that may be used with one or more techniques of this disclosure.

FIG. 14 is a conceptual diagram illustrating an example range-finding system 600 that may be used with one or more techniques of this disclosure. In the example of FIG. 14, range-finding system 600 includes an illuminator 602 and a sensor 604. Illuminator 602 may emit light 606. In some examples, illuminator 602 may emit light 606 as one or more laser beams. Light 606 may be in one or more wavelengths, such as an infrared wavelength or a visible light wavelength. In other examples, light 606 is not coherent, laser light. When light 606 encounters an object, such as object 608, light 606 creates returning light 610. Returning light 610 may include backscattered and/or reflected light. Returning light 610 may pass through a lens 611 that directs returning light 610 to create an image 612 of object 608 on sensor 604.

Sensor 604 generates signals 618 based on image 612. Image 612 may comprise a set of points (e.g., as represented by dots in image 612 of FIG. 14).

In some examples, illuminator 602 and sensor 604 may be mounted on a spinning structure so that illuminator 602 and sensor 604 capture a 360-degree view of an environment. In other examples, range-finding system 600 may include one or more optical components (e.g., mirrors, collimators, diffraction gratings, etc.) that enable illuminator 602 and sensor 604 to detect objects within a specific range (e.g., up to 360-degrees). Although the example of FIG. 14 only shows a single illuminator 602 and sensor 604, range-finding system 600 may include multiple sets of illuminators and sensors.

In some examples, illuminator 602 generates a structured light pattern. In such examples, range-finding system 600 may include multiple sensors 604 upon which respective images of the structured light pattern are formed. Range-finding system 600 may use disparities between the images of the structured light pattern to determine a distance to an object 608 from which the structured light pattern backscatters. Structured light-based range-finding systems may have a high level of accuracy (e.g., accuracy in the sub-millimeter range), when object 608 is relatively close to sensor 604 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 600 is a time of flight (ToF)-based system. In some examples where range-finding system 600 is a ToF-based system, illuminator 602 generates pulses of light. In other words, illuminator 602 may modulate the amplitude of emitted light 606. In such examples, sensor 604 detects returning light 610 from the pulses of light 606 generated by illuminator 602. Range-finding system 600 may then determine a distance to object 608 from which light 606 backscatters based on a delay between when light 606 was emitted and detected and the known speed of light in air). In some examples, rather than (or in addition to) modulating the amplitude of the emitted light 606, illuminator 602 may modulate the phase of the emitted light 606. In such examples, sensor 604 may detect the phase of returning light 610 from object 608 and determine distances to points on object 608 using the speed of light and based on time differences between when illuminator 602 generated light 606 at a specific phase and when sensor 604 detected returning light 610 at the specific phase.

In other examples, a point cloud may be generated without using illuminator 602. For instance, in some examples, sensor 604 of range-finding system 600 may include two or more optical cameras. In such examples, range-finding system 600 may use the optical cameras to capture stereo images of the environment, including object 608. Range-finding system 600 (e.g., point cloud generator 620) may then calculate the disparities between locations in the stereo images. Range-finding system 600 may then use the disparities to determine distances to the locations shown in the stereo images. From these distances, point cloud generator 620 may generate a point cloud.

Sensors 604 may also detect other attributes of object 608, such as color and reflectance information. In the example of FIG. 14, a point cloud generator 620 may generate a point cloud based on signals 618 generated by sensor 604. Range-finding system 600 and/or point cloud generator 620 may form part of data source 104 (FIG. 1).

Figure 15:
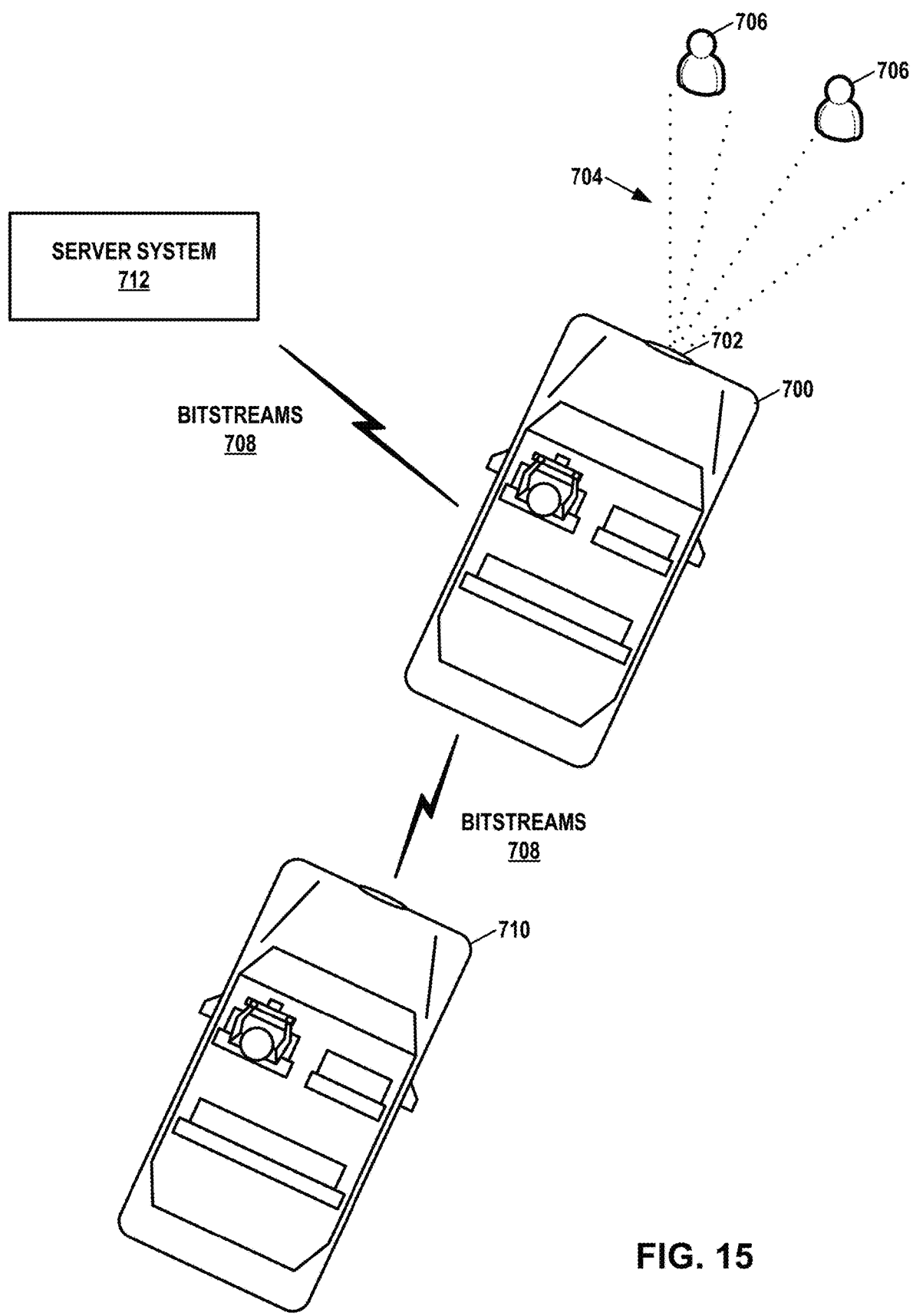
FIG. 15 is a conceptual diagram illustrating an example vehicle-based scenario in which one or more techniques of this disclosure may be used.

FIG. 15 is a conceptual diagram illustrating an example vehicle-based scenario in which one or more techniques of this disclosure may be used. In the example of FIG. 15, a vehicle 700 includes a laser package 702, such as a LIDAR system. Although not shown in the example of FIG. 15, vehicle 700 may also include a data source and a G-PCC encoder, such as G-PCC encoder 200 (FIG. 1). In the example of FIG. 15, laser package 702 emits laser beams 704 that reflect off pedestrians 706 or other objects in a roadway. The data source of vehicle 700 may generate a point cloud based on signals generated by laser package 702. The G-PCC encoder of vehicle 700 may encode the point cloud to generate bitstreams 708. Bitstreams 708 may include many fewer bits than the unencoded point cloud obtained by the G-PCC encoder. An output interface of vehicle 700 (e.g., output interface 108 (FIG. 1) may transmit bitstreams 708 to one or more other devices. Thus, vehicle 700 may be able to transmit bitstreams 708 to other devices more quickly than the unencoded point cloud data. Additionally, bitstreams 708 may require less data storage capacity.

In the example of FIG. 15, vehicle 700 may transmit bitstreams 708 to another vehicle 710. Vehicle 710 may include a G-PCC decoder, such as G-PCC decoder 300 (FIG. 1). The G-PCC decoder of vehicle 710 may decode bitstreams 708 to reconstruct the point cloud. Vehicle 710 may use the reconstructed point cloud for various purposes. For instance, vehicle 710 may determine based on the reconstructed point cloud that pedestrians 706 are in the roadway ahead of vehicle 700 and therefore start slowing down, e.g., even before a driver of vehicle 710 realizes that pedestrians 706 are in the roadway. Thus, in some examples, vehicle 710 may perform an autonomous navigation operation, generate a notification or warning, or perform another action based on the reconstructed point cloud.

Additionally or alternatively, vehicle 700 may transmit bitstreams 708 to a server system 712. Server system 712 may use bitstreams 708 for various purposes. For example, server system 712 may store bitstreams 708 for subsequent reconstruction of the point clouds. In this example, server system 712 may use the point clouds along with other data (e.g., vehicle telemetry data generated by vehicle 700) to train an autonomous driving system. In other example, server system 712 may store bitstreams 708 for subsequent reconstruction for forensic crash investigations (e.g., if vehicle 700 collides with pedestrians 706) or may transmit notifications or instructions for navigation to vehicle 700 or vehicle 710.

Figure 16:
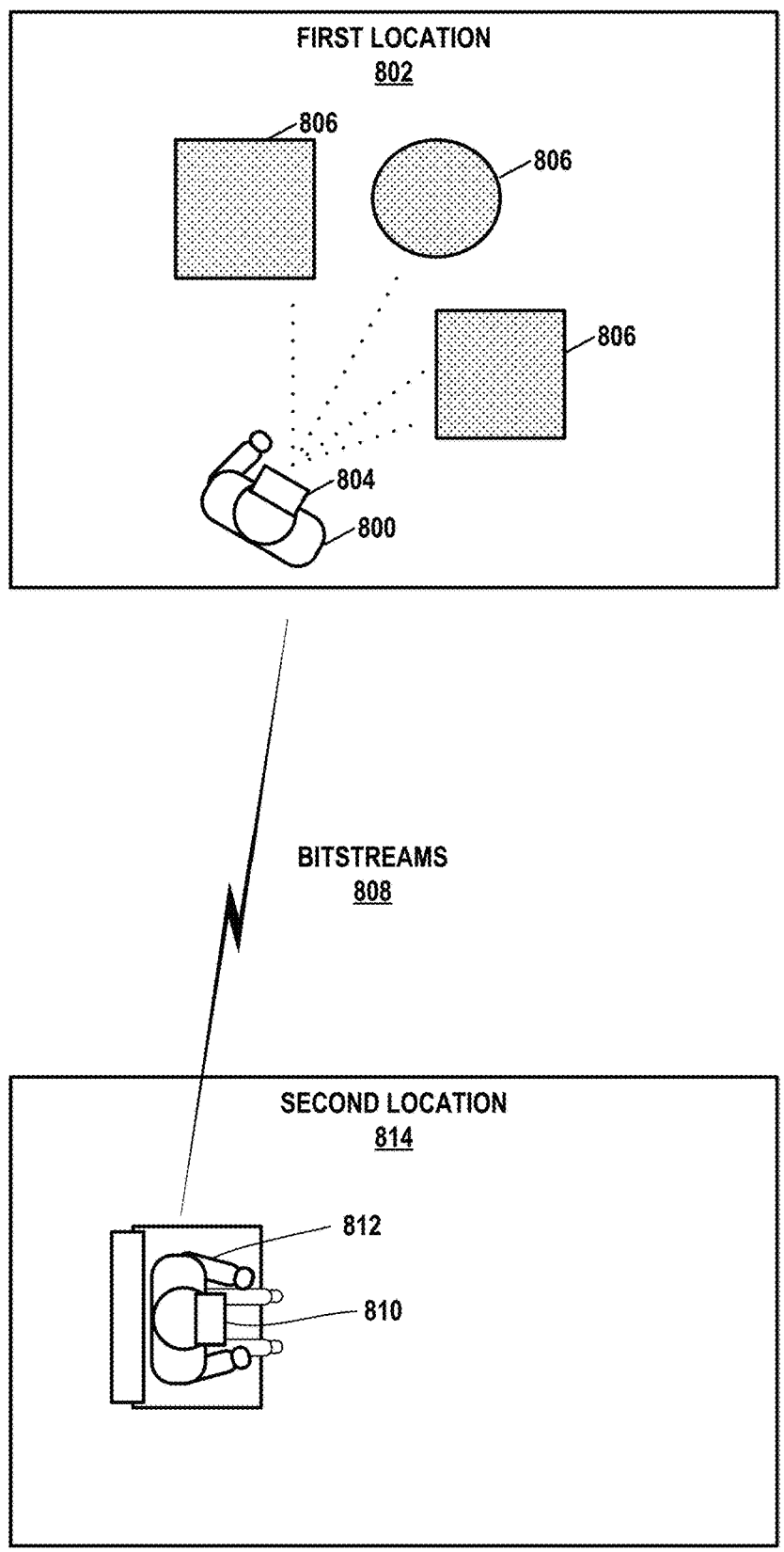
FIG. 16 is a conceptual diagram illustrating an example extended reality system in which one or more techniques of this disclosure may be used.

FIG. 16 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 16, a user 800 is located in a first location 802. User 800 wears an XR headset 804. As an alternative to XR headset 804, user 800 may use a mobile device (e.g., mobile phone, tablet computer, etc.). XR headset 804 includes a depth detection sensor, such as a LIDAR system, that detects positions of points on objects 806 at first location 802. A data source of XR headset 804 may use the signals generated by the depth detection sensor to generate a point cloud representation of objects 806 at first location 802. XR headset 804 may include a G-PCC encoder (e.g., G-PCC encoder 200 of FIG. 1) that is configured to encode the point cloud to generate bitstreams 808.

XR headset 804 may transmit bitstreams 808 (e.g., via a network such as the Internet) to an XR headset 810 worn by a user 812 at a second location 814. XR headset 810 may decode bitstreams 808 to reconstruct the point cloud. XR headset 810 may use the point cloud to generate an XR visualization (e.g., an AR, MR, VR visualization) representing objects 806 at first location 802. Thus, in some examples, such as when XR headset 810 generates a VR visualization, user 812 at location 814 may have a 3D immersive experience of first location 802. In some examples, XR headset 810 may determine a position of a virtual object based on the reconstructed point cloud. For instance, XR headset 810 may determine, based on the reconstructed point cloud, that an environment (e.g., first location 802) includes a flat surface and then determine that a virtual object (e.g., a cartoon character) is to be positioned on the flat surface. XR headset 810 may generate an XR visualization in which the virtual object is at the determined position. For instance, XR headset 810 may show the cartoon character sitting on the flat surface.

Figure 17:
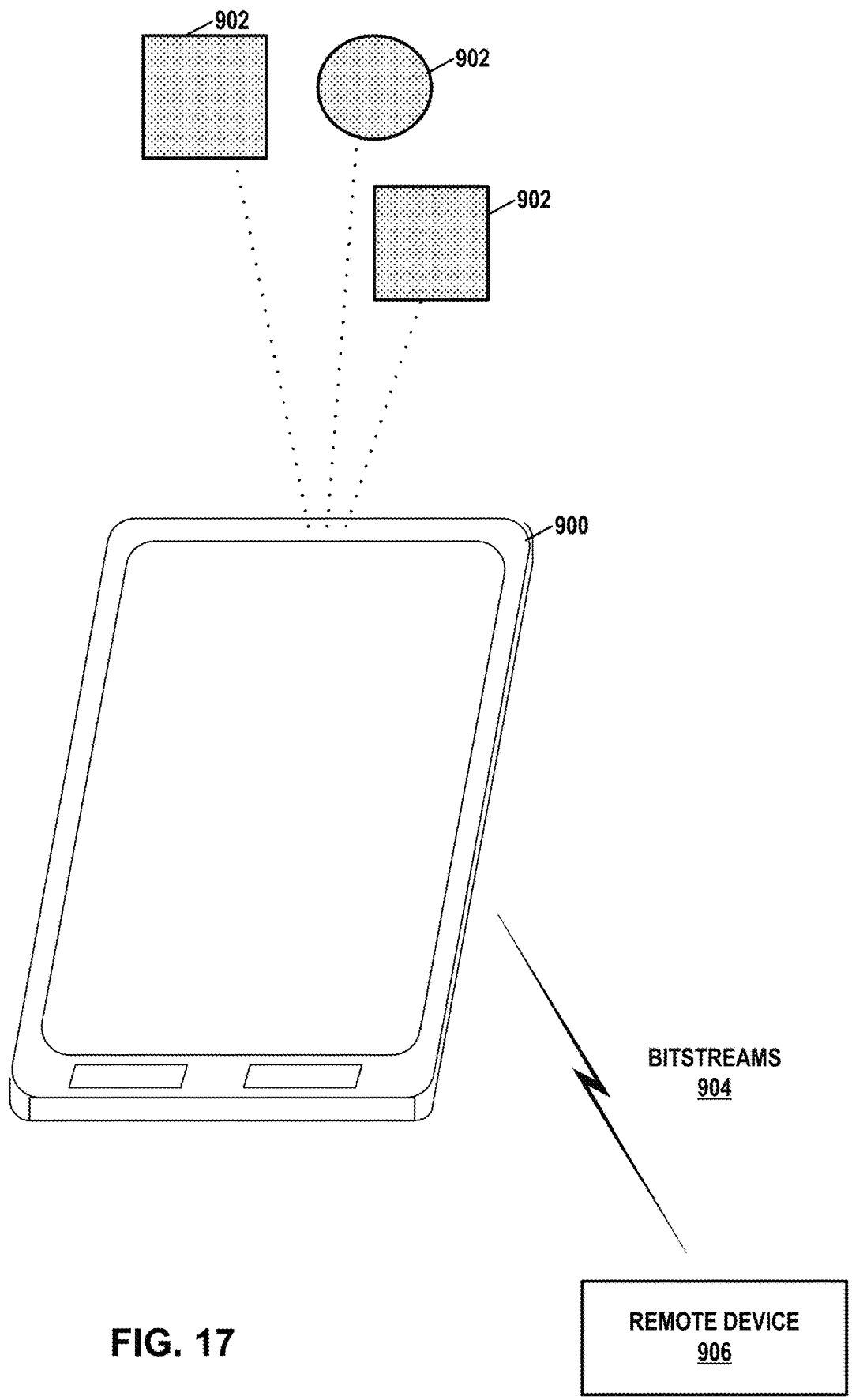
FIG. 17 is a conceptual diagram illustrating an example mobile device system in which one or more techniques of this disclosure may be used.

FIG. 17 is a conceptual diagram illustrating an example mobile device system in which one or more techniques of this disclosure may be used. In the example of FIG. 17, a mobile device 900, such as a mobile phone or tablet computer, includes a depth detection sensor, such as a LIDAR system, that detects positions of points on objects 902 in an environment of mobile device 900. A data source of mobile device 900 may use the signals generated by the depth detection sensor to generate a point cloud representation of objects 902. Mobile device 900 may include a G-PCC encoder (e.g., G-PCC encoder 200 of FIG. 1) that is configured to encode the point cloud to generate bitstreams 904. In the example of FIG. 17, mobile device 900 may transmit bitstreams to a remote device 906, such as a server system or other mobile device. Remote device 906 may decode bitstreams 904 to reconstruct the point cloud. Remote device 906 may use the point cloud for various purposes. For example, remote device 906 may use the point cloud to generate a map of environment of mobile device 900. For instance, remote device 906 may generate a map of an interior of a building based on the reconstructed point cloud. In another example, remote device 906 may generate imagery (e.g., computer graphics) based on the point cloud. For instance, remote device 906 may use points of the point cloud as vertices of polygons and use color attributes of the points as the basis for shading the polygons. In some examples, remote device 906 may perform facial recognition using the point cloud.

Figure 18:
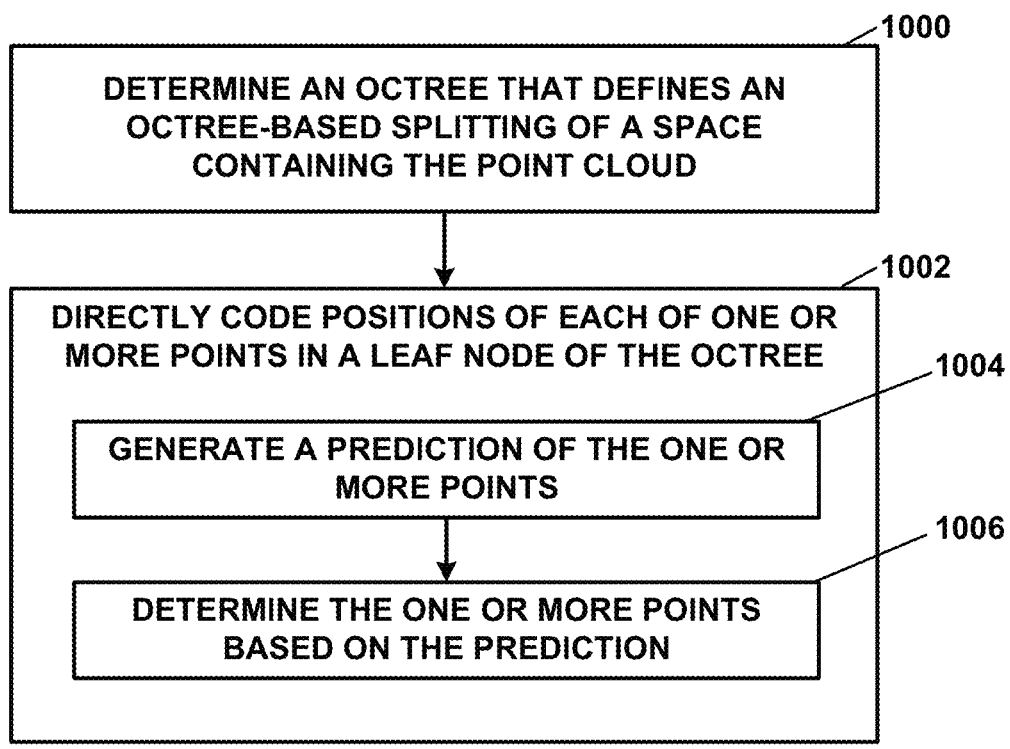
FIG. 18 is a flowchart illustrating an example operation for decoding a bitstream that includes point cloud data.

FIG. 18 is a flowchart illustrating an example operation for decoding a bitstream that includes point cloud data. G-PCC decoder 300 may perform the operation of FIG. 18 as part of decoding a point cloud. In the example of FIG. 18, G-PCC decoder 300 determines an octree that defines an octree-based splitting of a space containing the point cloud (1000). A leaf node of the octree contains one or more points of the point cloud.

G-PCC decoder 300 directly codes positions of each of the one or more points in the leaf node (1002). To directly code the positions of each of the one or more points in the leaf node, G-PCC decoder 300 generates a prediction of the one or more points (1004) and determines the one or more points based on the prediction (1006). To directly decode the positions of each of the one or more points in the leaf node, G-PCC decoder 300 may be configured to receive a flag, wherein a first value for the flag indicates the prediction of the one or more points is generated by intra prediction and a second value for the flag indicates the prediction of the one or more points is generated by inter prediction and based on a value of the flag, decode the one or more points using intra prediction or inter prediction.

G-PCC decoder 300 may be configured to receive, in the bitstream for the point cloud, an octree-leaf volume specifying a volume of the leaf node. For example, assume that a whole point cloud is encapsulated in W×W×W cuboid. The point cloud may be recursively split, and for a given split depth d, the octree leaf volume is $W/2^d \times W/2^d \times W/2d$. At this level, an occupancy flag (binary) may be signaled, which when equal to 1 indicates that the cuboid has at least one point. When the occupancy flag is 1, then a further intra or inter flag may be signaled respectively indicating whether the points inside the cuboid are intra or inter predicted.

To generate the prediction of the one or more points, G-PCC decoder 300 may be further configured to generate the prediction of the one or more points using intra prediction, and to generate the prediction of the one or more points using intra prediction, G-PCC decoder 300 may be further configured to determine a local predictive tree for the one or more points.

To determine the one or more points based on the prediction, G-PCC decoder 300 may be configured to receive, in a bitstream for the point cloud, at least one of a prediction mode, a primary residual, and a secondary residual for each of the one or more points. To generate the prediction of the one or more points, G-PCC decoder 300 may be configured to generate the prediction of the one or more points using inter prediction, and to generate the prediction of the one or more points using inter prediction, G-PCC decoder 300 may be further configured to perform motion estimation with the one or more points to determine a similar set of points in a reference point cloud frame.

To generate the prediction of the one or more points, G-PCC decoder 300 may be further configured to generate the prediction of the one or more points using inter prediction, and to generate the prediction of the one or more points using inter prediction, G-PCC decoder 300 may be further configured to perform motion compensation to predict the one or more points based on a set of points in a reference point cloud frame. To perform motion compensation, G-PCC decoder 300 may be further configured to apply a motion vector to the set of points in the reference point cloud frame to determine predictions of the one or more points. G-PCC decoder 300 may be configured to predict the motion vector based on a motion vector of a spatio-temporal neighboring inter octree-leaf.

G-PCC decoder 300 may be further configured to reconstruct a point cloud from the point cloud data. As part of reconstructing the point cloud, G-PCC decoder 300 may be further configured to determine positions of one or more points of the point cloud based on the plane position.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The following numbered clauses illustrate one or more aspects of the devices and techniques described in this disclosure.

Clause 1A: A method of coding a point cloud, the method comprising: determining an octree that defines an octree-based splitting of a space containing the point cloud, wherein: a leaf node of the octree contains one or more points of the point cloud, and positions of each of the one or more points in the leaf node are directly signaled; generating a prediction of the one or more points using intra prediction or inter prediction; and coding a syntax element that indicates whether the one or more points predicted using intra prediction or inter prediction.

Clause 2A: The method of clause 1A, wherein an octree-leaf volume specifying a volume of the leaf node is signaled in a bitstream.

Clause 3A: The method of clauses 1A or 2A, wherein: generating the prediction of the one or more points comprises generating the prediction of the one or more points using intra prediction, and generating the prediction of the one or more points using intra prediction comprises determining a local predictive tree for the one or more points.

Clause 4A: The method of clause 3A, wherein at least one of a prediction mode, a primary residual, and a secondary residual is signaled for each of the one or more points.

Clause 5A: The method of clauses 1A or 2A, wherein: generating the prediction of the one or more points comprises generating the prediction of the one or more points using inter prediction, and generating the prediction of the one or more points using inter prediction comprises performing motion estimation with the one or more points to determine a similar set of points in a reference point cloud frame.

Clause 6A: The method of any of clauses 1A, 2A, or 5A wherein: generating the prediction of the one or more points comprises generating the prediction of the one or more points using inter prediction, and generating the prediction of the one or more points using inter prediction comprises performing motion compensation to predict the one or more points based on a set of points in a reference point cloud frame.

Clause 7A: The method of clause 6A, wherein performing motion compensation comprises: applying a motion vector to the set of points in the reference point cloud frame to determine predictions of the one or more points.

Clause 8A: The method of clause 7A, further comprising predicting the motion vector based on a motion vector of a spatio-temporal neighboring inter octree-leaf.

Clause 9A: The method of any of clauses 1A-8A, further comprising generating the point cloud.

Clause 10A: A device for processing a point cloud, the device comprising one or more means for performing the method of any of clauses 1A-9A.

Clause 11A: The device of clause 10A, wherein the one or more means comprise one or more processors implemented in circuitry.

Clause 12A: The device of any of clauses 10A or 11A, further comprising a memory to store the data representing the point cloud.

Clause 13A: The device of any of clauses 10A-12A, wherein the device comprises a decoder.

Clause 14A: The device of any of clauses 10A-13A, wherein the device comprises an encoder.

Clause 15A: The device of any of clauses 10A-14A, further comprising a device to generate the point cloud.

Clause 16A: The device of any of clauses 10A-15A, further comprising a display to present imagery based on the point cloud.

Clause 17A: A computer-readable storage medium having stored thereon instructions that, when executed, cause one or more processors to perform the method of any of clauses 1A-9A.

Clause 1B: A device for decoding a bitstream that includes point cloud data, the device comprising: a memory to store the point cloud data; and one or more processors coupled to the memory and implemented in circuitry, the one or more processors configured to: determine an octree that defines an octree-based splitting of a space containing the point cloud, wherein a leaf node of the octree contains one or more points of the point cloud; and directly decode positions of each of the one or more points in the leaf node, wherein to directly decode the positions of each of the one or more points in the leaf node, the one or more processors are further configured to: generate a prediction of the one or more points; and determine the one or more points based on the prediction.

Clause 2B: The device of clause 1B, wherein to directly decode the positions of each of the one or more points in the leaf node, the one or more processors are further configured to: receive a flag, wherein a first value for the flag indicates the prediction of the one or more points is generated by intra prediction and a second value for the flag indicates the prediction of the one or more points is generated by inter prediction; and based on a value of the flag, decode the one or more points using intra prediction or inter prediction.

Clause 3B: The device of clause 1B, wherein the one or more processors are further configured to: receive, in the bitstream that includes the point cloud, an octree-leaf volume specifying a volume of the leaf node.

Clause 4B: The device of clause 1B, wherein: to generate the prediction of the one or more points, the one or more processors are further configured to generate the prediction of the one or more points using intra prediction, and to generate the prediction of the one or more points using intra prediction, the one or more processors are further configured to determine a local predictive tree for the one or more points.

Clause 5B: The device of clause 1B, wherein to determine the one or more points based on the prediction, the one or more processors are further configured to: receive, in the bitstream that includes the point cloud, at least one of a prediction mode, a primary residual, and a secondary residual for each of the one or more points.

Clause 6B: The device of clause 1B, wherein: to generate the prediction of the one or more points, the one or more processors are further configured to generate the prediction of the one or more points using inter prediction, and to generate the prediction of the one or more points using inter prediction, the one or more processors are further configured to perform motion estimation with the one or more points to determine a similar set of points in a reference point cloud frame.

Clause 7B: The device of clause 1B, wherein: to generate the prediction of the one or more points, the one or more processors are further configured to generate the prediction of the one or more points using inter prediction, and to generate the prediction of the one or more points using inter prediction, the one or more processors are further configured to perform motion compensation to predict the one or more points based on a set of points in a reference point cloud frame.

Clause 8B: The device of clause 7B, wherein to perform motion compensation, the one or more processors are further configured to: apply a motion vector to the set of points in the reference point cloud frame to determine predictions of the one or more points.

Clause 9B: The device of clause 8B, wherein the one or more processors are further configured to predict the motion vector based on a motion vector of a spatio-temporal neighboring inter octree-leaf.

Clause 10B: The device of clause 1B, wherein the one or more processors are further configured to reconstruct a point cloud from the point cloud data.

Clause 11B: The device of clause 10B, wherein the one or more processors are configured to, as part of reconstructing the point cloud, determine positions of one or more points of the point cloud based on the plane position.

Clause 11B: The device of clause 10B, wherein the one or more processors are configured to, as part of reconstructing the point cloud, determine positions of one or more points of the point cloud based on the directly decoded positions of each of the one or more points in the leaf node.

Clause 12B: The device of clause 11B, wherein the one or more processors are further configured to generate a map of an interior of a building based on the point cloud.

Clause 13B: The device of clause 11B, wherein the one or more processors are further configured to perform an autonomous navigation operation based on the point cloud.

Clause 14B: The device of clause 11B, wherein the one or more processors are further configured to generate computer graphics based on the point cloud.

Clause 15B: The device of clause 11B, wherein the one or more processors are configured to: determine a position of a virtual object based on the point cloud; and generate an extended reality (XR) visualization in which the virtual object is at the determined position.

Clause 16B: The device of clause 11B, further comprising a display to present imagery based on the point cloud.

Clause 17B: The device of clause 1B, wherein the device is a mobile phone or a tablet computer.

Clause 18B: The device of clause 1B, wherein the device is a vehicle.

Clause 19B: The device of clause 1B, wherein the device is an extended reality device.

Clause 20B: A method of decoding a point cloud, the method comprising: determining an octree that defines an octree-based splitting of a space containing the point cloud, wherein a leaf node of the octree contains one or more points of the point cloud; directly decoding positions of each of the one or more points in the leaf node, wherein directly decoding the positions of each of the one or more points in the leaf node comprises: generating a prediction of the one or more points; and determining the one or more points based on the prediction.

Clause 21B: The method of clause 20B, wherein directly decoding the positions of each of the one or more points in the leaf node further comprises receiving a flag, wherein a first value for the flag indicates the prediction of the one or more points is generated by intra prediction and a second value for the flag indicates the prediction of the one or more points is generated by inter prediction; and based on a value of the flag, decoding the one or more points using intra prediction or inter prediction.

Clause 22B: The method of clause 20B, further comprising: receiving, in a bitstream for the point cloud, an octree-leaf volume specifying a volume of the leaf node.

Clause 23B: The method of clauses 20B, wherein: generating the prediction of the one or more points comprises generating the prediction of the one or more points using intra prediction, and generating the prediction of the one or more points using intra prediction comprises determining a local predictive tree for the one or more points.

Clause 24B: The method of clause 20B, wherein determining the one or more points based on the prediction comprises: receiving, in a bitstream for the point cloud, at least one of a prediction mode, a primary residual, and a secondary residual for each of the one or more points.

Clause 25B: The method of clause 20B, wherein: generating the prediction of the one or more points comprises generating the prediction of the one or more points using inter prediction, and generating the prediction of the one or more points using inter prediction comprises performing motion estimation with the one or more points to determine a similar set of points in a reference point cloud frame.

Clause 26B: The method of clause 20B, wherein: generating the prediction of the one or more points comprises generating the prediction of the one or more points using inter prediction, and generating the prediction of the one or more points using inter prediction comprises performing motion compensation to predict the one or more points based on a set of points in a reference point cloud frame.

Clause 27B: The method of clause 26B, wherein performing motion compensation comprises: applying a motion vector to the set of points in the reference point cloud frame to determine predictions of the one or more points.

Clause 28B: The method of clause 27B, further comprising predicting the motion vector based on a motion vector of a spatio-temporal neighboring inter octree-leaf.

Clause 29B: A computer-readable storage medium storing instructions that when executed by one or more processors cause the one or more processors to: determine an octree that defines an octree-based splitting of a space containing a point cloud, wherein a leaf node of the octree contains one or more points of the point cloud; and directly decode positions of each of the one or more points in the leaf node, wherein to directly decode the positions of each of the one or more points in the leaf node, the instructions cause the one or more processors to: generate a prediction of the one or more points; and determine the one or more points based on the prediction.

Clause 30B: An apparatus comprising: means for determining an octree that defines an octree-based splitting of a space containing the point cloud, wherein a leaf node of the octree contains one or more points of the point cloud; means for directly decoding positions of each of the one or more points in the leaf node, wherein the means for directly decoding the positions of each of the one or more points in the leaf node comprises: means for generating a prediction of the one or more points; and means for determining the one or more points based on the prediction.

Clause 1C: A device for decoding a bitstream that includes point cloud data, the device comprising: a memory to store the point cloud data; and one or more processors coupled to the memory and implemented in circuitry, the one or more processors configured to: determine an octree that defines an octree-based splitting of a space containing the point cloud, wherein a leaf node of the octree contains one or more points of the point cloud; and directly decode positions of each of the one or more points in the leaf node, wherein to directly decode the positions of each of the one or more points in the leaf node, the one or more processors are further configured to: generate a prediction of the one or more points; and determine the one or more points based on the prediction.

Clause 2C: The device of clause 1C, wherein to directly decode the positions of each of the one or more points in the leaf node, the one or more processors are further configured to: receive a flag, wherein a first value for the flag indicates the prediction of the one or more points is generated by intra prediction and a second value for the flag indicates the prediction of the one or more points is generated by inter prediction; and based on a value of the flag, decode the one or more points using intra prediction or inter prediction.

Clause 3C: The device of clauses 1C or 2C, wherein the one or more processors are further configured to: receive, in the bitstream that includes the point cloud, an octree-leaf volume specifying a volume of the leaf node.

Clause 4C: The device of any of clauses 1C-3C, wherein: to generate the prediction of the one or more points, the one or more processors are further configured to generate the prediction of the one or more points using intra prediction, and to generate the prediction of the one or more points using intra prediction, the one or more processors are further configured to determine a local predictive tree for the one or more points.

Clause 5C: The device of any of clauses 1C-4C, wherein to determine the one or more points based on the prediction, the one or more processors are further configured to: receive, in the bitstream that includes the point cloud, at least one of a prediction mode, a primary residual, and a secondary residual for each of the one or more points.

Clause 6C: The device of any of clauses 1C-5C, wherein: to generate the prediction of the one or more points, the one or more processors are further configured to generate the prediction of the one or more points using inter prediction, and to generate the prediction of the one or more points using inter prediction, the one or more processors are further configured to perform motion estimation with the one or more points to determine a similar set of points in a reference point cloud frame.

Clause 7C: The device of any of clauses 1C-5C, wherein: to generate the prediction of the one or more points, the one or more processors are further configured to generate the prediction of the one or more points using inter prediction, and to generate the prediction of the one or more points using inter prediction, the one or more processors are further configured to perform motion compensation to predict the one or more points based on a set of points in a reference point cloud frame.

Clause 8C: The device of clause 7C, wherein to perform motion compensation, the one or more processors are further configured to: apply a motion vector to the set of points in the reference point cloud frame to determine predictions of the one or more points.

Clause 9C: The device of clause 8C, wherein the one or more processors are further configured to predict the motion vector based on a motion vector of a spatio-temporal neighboring inter octree-leaf.

Clause 10C: The device of any of clauses 1C-9C, wherein the one or more processors are further configured to reconstruct a point cloud from the point cloud data.

Clause 11C: The device of clause 10C, wherein the one or more processors are configured to, as part of reconstructing the point cloud, determine positions of one or more points of the point cloud based on the directly decoded positions of each of the one or more points in the leaf node Clause 12C: The device of clause 11C, wherein the one or more processors are further configured to generate a map of an interior of a building based on the point cloud.

Clause 13C: The device of clause 11C, wherein the one or more processors are further configured to perform an autonomous navigation operation based on the point cloud.

Clause 14C: The device of clause 11C, wherein the one or more processors are further configured to generate computer graphics based on the point cloud.

Clause 15C: The device of clause 11C, wherein the one or more processors are configured to: determine a position of a virtual object based on the point cloud; and generate an extended reality (XR) visualization in which the virtual object is at the determined position.

Clause 16C: The device of any of clauses 11C-15C, further comprising a display to present imagery based on the point cloud.

Clause 17C: The device of any of clauses 1C-16C, wherein the device is a mobile phone or a tablet computer.

Clause 18C: The device of any of clauses 1C-16C, wherein the device is a vehicle.

Clause 19C: The device of any of clauses 1C-16C, wherein the device is an extended reality device.

Clause 20C: A method of decoding a point cloud, the method comprising: determining an octree that defines an octree-based splitting of a space containing the point cloud, wherein a leaf node of the octree contains one or more points of the point cloud; directly decoding positions of each of the one or more points in the leaf node, wherein directly decoding the positions of each of the one or more points in the leaf node comprises: generating a prediction of the one or more points; and determining the one or more points based on the prediction.

Clause 21C: The method of clause 20C, wherein directly decoding the positions of each of the one or more points in the leaf node further comprises: receiving a flag, wherein a first value for the flag indicates the prediction of the one or more points is generated by intra prediction and a second value for the flag indicates the prediction of the one or more points is generated by inter prediction; and based on a value of the flag, decoding the one or more points using intra prediction or inter prediction.

Clause 22C: The method of clause 20C or 21C, further comprising: receiving, in a bitstream for the point cloud, an octree-leaf volume specifying a volume of the leaf node.

Clause 23C: The method of any of clauses 20C-22C, wherein: generating the prediction of the one or more points comprises generating the prediction of the one or more points using intra prediction, and generating the prediction of the one or more points using intra prediction comprises determining a local predictive tree for the one or more points.

Clause 24C: The method of any of clauses 20C-23C, wherein determining the one or more points based on the prediction comprises: receiving, in a bitstream for the point cloud, at least one of a prediction mode, a primary residual, and a secondary residual for each of the one or more points.

Clause 25C: The method of any of clauses 20C-24C, wherein: generating the prediction of the one or more points comprises generating the prediction of the one or more points using inter prediction, and generating the prediction of the one or more points using inter prediction comprises performing motion estimation with the one or more points to determine a similar set of points in a reference point cloud frame.

Clause 26C: The method of any of clauses 20C-25C, wherein: generating the prediction of the one or more points comprises generating the prediction of the one or more points using inter prediction, and generating the prediction of the one or more points using inter prediction comprises performing motion compensation to predict the one or more points based on a set of points in a reference point cloud frame.

Clause 27C: The method of clause 26C, wherein performing motion compensation comprises: applying a motion vector to the set of points in the reference point cloud frame to determine predictions of the one or more points.

Clause 28C: The method of clause 27C, further comprising predicting the motion vector based on a motion vector of a spatio-temporal neighboring inter octree-leaf.

Various examples have been described. These and other examples are within the scope of the following claims.

What is claimed is:

1. A device for decoding a bitstream that includes point cloud data, the device comprising:

a memory to store the point cloud data; and one or more processors coupled to the memory and implemented in circuitry, the one or more processors configured to:

determine an octree that defines an octree-based splitting of a three-dimensional (3D) space containing a point cloud, wherein the octree comprises a plurality of nodes at different levels including a leaf-node level corresponding to a level at which the octree-based splitting stops; and in response to a node being at the leaf-node level, directly decode positions of each of one or more points in the node, wherein to directly decode the positions of each of the one or more points in the node, the one or more processors are further configured to:

generate predictions of the positions of the one or more points in the 3D space;

determine differences between the predictions of the positions and the positions; and determine the positions of the one or more points in the 3D space based on the predictions of the positions and the differences.

2. The device of claim 1, wherein to directly decode the positions of each of the one or more points in the leaf node, the one or more processors are further configured to:

receive a flag, wherein a first value for the flag indicates the prediction of the positions of the one or more points in the 3D space is generated by intra prediction and a second value for the flag indicates the prediction of the positions of the one or more points in the 3D space is generated by inter prediction; and based on a value of the flag, decode the positions of the one or more points using intra prediction or inter prediction.

3. The device of claim 1, wherein the one or more processors are further configured to receive, in the bitstream that includes the point cloud, an octree-leaf volume specifying a volume of the leaf node.

4. The device of claim 1, wherein:

to generate the prediction of the positions of the one or more points in the 3D space, the one or more processors are further configured to generate the prediction of the positions of the one or more points in the 3D space using intra prediction, and to generate the prediction of the positions of the one or more points in the 3D space using intra prediction, the one or more processors are further configured to determine a local predictive tree for the positions of the one or more points.

5. The device of claim 1, wherein to determine the positions of the one or more points based on the prediction, the one or more processors are further configured to receive, in the bitstream that includes the point cloud, at least one of a prediction mode, a primary residual, and a secondary residual for each of the one or more points.

6. The device of claim 1, wherein:

to generate the prediction of the positions of the one or more points in the 3D space, the one or more processors are further configured to generate the prediction of the positions of the one or more points in the 3D space using inter prediction, and to generate the prediction of the positions of the one or more points in the 3D space using inter prediction, the one or more processors are further configured to perform motion estimation with respect to the positions of the one or more points to determine a similarly positioned set of occupied points in a reference point cloud frame.

7. The device of claim 1, wherein:

to generate the prediction of the positions of the one or more points in the 3D space, the one or more processors are further configured to generate the prediction of the positions of the one or more points in the 3D space using inter prediction, and to generate the prediction of the positions of the one or more points in the 3D space using inter prediction, the one or more processors are further configured to perform motion compensation to predict the positions of the one or more points based on a set of points in a reference point cloud frame.

8. The device of claim 7, wherein to perform motion compensation, the one or more processors are further configured to apply a motion vector to the set of points in the reference point cloud frame to determine predictions of the positions of the one or more points.

9. The device of claim 8, wherein the one or more processors are further configured to predict the motion vector based on a motion vector of a spatio-temporal neighboring inter octree-leaf.

10. The device of claim 1, wherein the one or more processors are further configured to reconstruct the point cloud from the point cloud data.

11. The device of claim 10, wherein the one or more processors are configured to, as part of reconstructing the point cloud, determine positions of one or more points of the point cloud based on the directly decoded positions of each of the one or more points in the node.

12. The device of claim 11, wherein the one or more processors are further configured to generate a map of an interior of a building based on the point cloud.

13. The device of claim 11, wherein the one or more processors are further configured to perform an autonomous navigation operation based on the point cloud.

14. The device of claim 11, wherein the one or more processors are further configured to generate computer graphics based on the point cloud.

15. The device of claim 11, wherein the one or more processors are configured to:

determine a position of a virtual object based on the point cloud; and generate an extended reality (XR) visualization in which the virtual object is at the determined position of the virtual object.

16. The device of claim 11, further comprising a display to present imagery based on the point cloud.

17. The device of claim 1, wherein the device is a mobile phone or a tablet computer.

18. The device of claim 1, wherein the device is a vehicle.

19. The device of claim 1, wherein the device is an extended reality device.

20. A method of decoding a point cloud, the method comprising:

determining an octree that defines an octree-based splitting of a three-dimensional (3D) space containing a point cloud, wherein the octree comprises a plurality of nodes at different levels including a leaf-node level corresponding to a level at which the octree-based splitting stops;

in response to a node being at the leaf-node level, directly decoding positions of each of one or more points in the node, wherein directly decoding the positions of each of the one or more points in the node comprises:

generating predictions of the positions of the one or more points in the 3D space;

determining differences between the predictions of the positions and the positions; and determining the positions of the one or more points in the 3D space based on the predictions of the positions and the differences.

21. The method of claim 20, wherein directly decoding the positions of each of the one or more points in the node further comprises:

receiving a flag, wherein a first value for the flag indicates the prediction of the positions of the one or more points in the 3D space is generated by intra prediction and a second value for the flag indicates the prediction of the positions of the one or more points in the 3D space is generated by inter prediction; and based on a value of the flag, decoding the positions of the one or more points using intra prediction or inter prediction.

22. The method of claim 20, further comprising receiving, in a bitstream for the point cloud, an octree-leaf volume specifying a volume of the node.

23. The method of claim 20, wherein:
generating the prediction of the positions of the one or more points in the 3D space comprises generating the prediction of the positions of the one or more points in the 3D space using intra prediction, and
generating the prediction of the positions of the one or more points in the 3D space using intra prediction comprises determining a local predictive tree for the positions of the one or more points.

24. The method of claim 20, wherein determining the positions of the one or more points based on the prediction comprises receiving, in a bitstream for the point cloud, at least one of a prediction mode, a primary residual, and a secondary residual for each of the one or more points.

25. The method of claim 20, wherein:
generating the prediction of the positions of the one or more points in the 3D space comprises generating the prediction of the positions of the one or more points in the 3D space using inter prediction, and
generating the prediction of the positions of the one or more points in the 3D space using inter prediction comprises performing motion estimation with the positions of the one or more points to determine a similarly positioned set of occupied points in a reference point cloud frame.

26. The method of claim 20, wherein:
generating the prediction of the positions of the one or more points in the 3D space comprises generating the prediction of the positions of the one or more points in the 3D space using inter prediction, and
generating the prediction of the positions of the one or more points in the 3D space using inter prediction comprises performing motion compensation to predict the positions of the one or more points based on a similarly positioned set of points in a reference point cloud frame.

27. The method of claim 26, wherein performing motion compensation comprises applying a motion vector to the set of points in the reference point cloud frame to determine predictions of the positions of the one or more points.

28. The method of claim 27, further comprising predicting the motion vector based on a motion vector of a spatio-temporal neighboring inter octree-leaf.

29. A computer-readable storage medium storing instructions that when executed by one or more processors cause the one or more processors to:

determine an octree that defines an octree-based splitting of a three-dimensional (3D) space containing a point cloud, wherein the octree comprises a plurality of nodes at different levels including a leaf-node level corresponding to a level at which the octree-based splitting stops; and in response to a node being at the leaf-node level, directly decode positions of each of one or more points in the node, wherein to directly decode the positions of each of the one or more points in the leaf node, the instructions cause the one or more processors to:

generate predictions of the positions of the one or more points in the 3D space;

determine differences between the predictions of the positions and the positions; and determine the positions of the one or more points in the 3D space based on the predictions of the positions and the differences.

30. An apparatus comprising:
means for determining an octree that defines an octree-based splitting of a three-dimensional (3D) space containing a point cloud, wherein the octree comprises a plurality of nodes at different levels including a leaf-node level corresponding to a level at which the octree-based splitting stops;

means for directly decoding positions of each of one or more points in a node in response to the node being at the leaf-node level, wherein the means for directly decoding the positions of each of the one or more points in the node comprises:

means for generating predictions of the positions of the one or more points in the 3D space;

means for determining differences between the predictions of the positions and the positions; and means for determining the positions of the one or more points in the 3D space based on the predictions of the positions and the differences.

* * * * *